(12) United States Patent
Fujimoto

(10) Patent No.: US 11,134,190 B2
(45) Date of Patent: Sep. 28, 2021

(54) IMAGING DEVICE, IMAGING METHOD, ELECTRONIC DEVICE, AND SIGNAL PROCESSING DEVICE

(71) Applicant: SONY SEMICONDUCTOR SOLUTIONS CORPORATION, Kanagawa (JP)

(72) Inventor: Masakatsu Fujimoto, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 160 days.

(21) Appl. No.: 16/463,674

(22) PCT Filed: Dec. 28, 2017

(86) PCT No.: PCT/JP2017/047372
§ 371 (c)(1),
(2) Date: May 23, 2019

(87) PCT Pub. No.: WO2018/131522
PCT Pub. Date: Jul. 19, 2018

(65) Prior Publication Data
US 2021/0120174 A1    Apr. 22, 2021

(30) Foreign Application Priority Data
Jan. 12, 2017 (JP) .............................. JP2017-003364

(51) Int. Cl.
*H04N 5/232* (2006.01)
*H04N 5/217* (2011.01)
(Continued)

(52) U.S. Cl.
CPC .............................. *H04N 5/23229* (2013.01)

(58) Field of Classification Search
CPC ................................................... H04N 5/23229
See application file for complete search history.

(56) References Cited

U.S. PATENT DOCUMENTS

| 2002/0067423 A1 | 6/2002 | Suzuki | |
|---|---|---|---|
| 2016/0227091 A1* | 8/2016 | Miura | H04N 5/2352 |
| 2018/0184028 A1* | 6/2018 | Saragaglia | H04N 5/3675 |

FOREIGN PATENT DOCUMENTS

| CN | 105847702 A | 8/2016 |
|---|---|---|
| JP | 2002-077666 A | 3/2002 |

(Continued)

OTHER PUBLICATIONS

Office Action for CN Patent Application No. 201780082171, dated Sep. 17, 2020.

(Continued)

*Primary Examiner* — Christopher K Peterson
(74) *Attorney, Agent, or Firm* — Chip Law Group

(57) ABSTRACT

The present disclosure relates to an imaging device, an imaging method, an electronic device, and a signal processing device capable of reducing an amount of information of a set value to be stored in an image processing block for reducing noise according to a noise amount and an interpolation operation amount thereof. Signal processing is performed on an image captured by an image sensor on the basis of a Gain value of the image sensor offset according to a temperature value of the image sensor. The present disclosure can be applied to an imaging device.

12 Claims, 14 Drawing Sheets

(51) Int. Cl.
  *H04N 5/243* (2006.01)
  *H04N 5/357* (2011.01)
  *H04N 9/04* (2006.01)
  *G03B 7/091* (2021.01)

(56) References Cited

FOREIGN PATENT DOCUMENTS

| | | |
|---|---|---|
| JP | 2006-135425 A | 5/2006 |
| JP | 2012-029194 A | 2/2012 |
| JP | 2016-144095 A | 8/2016 |

OTHER PUBLICATIONS

International Search Report and Written Opinion of PCT Application No. PCT/JP2017/047372, dated Feb. 20, 2018, 08 pages of ISRWO.

* cited by examiner

| | Parameter name | Set value of point Gain_a | Set value of point Gain_b | Set value of point Gain_c | Set value of point Gain_d |
|---|---|---|---|---|---|
| Sharpening processing circuit | Control parameter 1 | Set value A | Set value B | Set value C | Set value D |
| | Control parameter 2 | Set value E | Set value F | Set value G | Set value H |
| | Control parameter 3 | Set value I | Set value J | Set value K | Set value L |
| | ...Omitted... | | | | |
| | Control parameter n | Set value M | Set value N | Set value O | Set value P |
| Noise reduction processing circuit A | Control parameter 1 | Set value Q | Set value R | Set value S | Set value T |
| | Control parameter 2 | Set value U | Set value V | Set value W | Set value X |
| | Control parameter 3 | Set value Y | Set value Z | Set value AA | Set value AB |
| | ...Omitted... | | | | |
| | Control parameter n | Set value AC | Set value AD | Set value AE | Set value AF |
| Noise reduction processing circuit B | Control parameter 1 | Set value AG | Set value AH | Set value AI | Set value AJ |
| | Control parameter 2 | Set value AK | Set value AL | Set value AM | Set value AN |
| | Control parameter 3 | Set value AO | Set value AP | Set value AQ | Set value AR |
| | ...Omitted... | | | | |
| | Control parameter n | Set value AS | Set value AT | Set value AU | Set value AV |
| | ...Omitted... | | | | |
| Noise reduction processing circuit N | Control parameter 1 | Set value AW | Set value AX | Set value AY | Set value AZ |
| | Control parameter 2 | Set value BA | Set value BB | Set value BC | Set value BD |
| | Control parameter 3 | Set value BE | Set value BF | Set value BG | Set value BH |
| | ...Omitted... | | | | |
| | Control parameter n | Set value BI | Set value BJ | Set value BK | Set value BL |
| Defect correction | Control parameter 1 | Set value AW | Set value AX | Set value AY | Set value AZ |
| | Control parameter 2 | Set value BA | Set value BB | Set value BC | Set value BD |
| | Control parameter 3 | Set value BE | Set value BF | Set value BG | Set value BH |
| | ...Omitted... | | | | |
| | Control parameter n | Set value BI | Set value BJ | Set value BK | Set value BL |
| | ...Omitted... | | | | |

| Parameter name | | Set value of point [temperature_1] | | | | Set value of point [temperature_2] | | | | Set value of point [temperature_3] | | | | Set value of point [temperature_4] | | | |
|---|---|---|---|---|---|---|---|---|---|---|---|---|---|---|---|---|---|
| | | Set value of point Gain_a | Set value of point Gain_b | Set value of point Gain_c | Set value of point Gain_d | Set value of point Gain_a | Set value of point Gain_b | Set value of point Gain_c | Set value of point Gain_d | Set value of point Gain_a | Set value of point Gain_b | Set value of point Gain_c | Set value of point Gain_d | Set value of point Gain_a | Set value of point Gain_b | Set value of point Gain_c | Set value of point Gain_d |
| Sharpening processing circuit | Control parameter 1 | Set value 1A | Set value 1B | Set value 1C | Set value 1D | Set value 2A | Set value 2B | Set value 2C | Set value 2D | Set value 3A | Set value 3B | Set value 3C | Set value 3D | Set value 4A | Set value 4B | Set value 4C | Set value 4D |
| | Control parameter 2 | Set value 1E | Set value 1F | Set value 1G | Set value 1H | Set value 2E | Set value 2F | Set value 2G | Set value 2H | Set value 3E | Set value 3F | Set value 3G | Set value 3H | Set value 4E | Set value 4F | Set value 4G | Set value 4H |
| | Control parameter 3 | Set value 1I | Set value 1J | Set value 1K | Set value 1L | Set value 2I | Set value 2J | Set value 2K | Set value 2L | Set value 3I | Set value 3J | Set value 3K | Set value 3L | Set value 4I | Set value 4J | Set value 4K | Set value 4L |
| | ...Omitted... | | | | | | | | | | | | | | | | |
| | Control parameter n | Set value 1M | Set value 1N | Set value 1O | Set value 1P | Set value 2M | Set value 2N | Set value 2O | Set value 2P | Set value 3M | Set value 3N | Set value 3O | Set value 3P | Set value 4M | Set value 4N | Set value 4O | Set value 4P |
| Noise reduction processing circuit A | Control parameter 1 | Set value 1Q | Set value 1R | Set value 1S | Set value 1T | Set value 2Q | Set value 2R | Set value 2S | Set value 2T | Set value 3Q | Set value 3R | Set value 3S | Set value 3T | Set value 4Q | Set value 4R | Set value 4S | Set value 4T |
| | Control parameter 2 | Set value 1U | Set value 1V | Set value 1W | Set value 1X | Set value 2U | Set value 2V | Set value 2W | Set value 2X | Set value 3U | Set value 3V | Set value 3W | Set value 3X | Set value 4U | Set value 4V | Set value 4W | Set value 4X |
| | Control parameter 3 | Set value 1Y | Set value 1Z | Set value 1AA | Set value 1AB | Set value 2Y | Set value 2Z | Set value 2AA | Set value 2AB | Set value 3Y | Set value 3Z | Set value 3AA | Set value 3AB | Set value 4Y | Set value 4Z | Set value 4AA | Set value 4AB |
| | ...Omitted... | | | | | | | | | | | | | | | | |
| | Control parameter n | Set value 1AC | Set value 1AD | Set value 1AE | Set value 1AF | Set value 2AC | Set value 2AD | Set value 2AE | Set value 2AF | Set value 3AC | Set value 3AD | Set value 3AE | Set value 3AF | Set value 4AC | Set value 4AD | Set value 4AE | Set value 4AF |
| Noise reduction processing circuit B | Control parameter 1 | Set value 1AG | Set value 1AH | Set value 1AI | Set value 1AJ | Set value 2AG | Set value 2AH | Set value 2AI | Set value 2AJ | Set value 3AG | Set value 3AH | Set value 3AI | Set value 3AJ | Set value 4AG | Set value 4AH | Set value 4AI | Set value 4AJ |
| | Control parameter 2 | Set value 1AK | Set value 1AL | Set value 1AM | Set value 1AN | Set value 2AK | Set value 2AL | Set value 2AM | Set value 2AN | Set value 3AK | Set value 3AL | Set value 3AM | Set value 3AN | Set value 4AK | Set value 4AL | Set value 4AM | Set value 4AN |
| | Control parameter 3 | Set value 1AO | Set value 1AP | Set value 1AQ | Set value 1AR | Set value 2AO | Set value 2AP | Set value 2AQ | Set value 2AR | Set value 3AO | Set value 3AP | Set value 3AQ | Set value 3AR | Set value 4AO | Set value 4AP | Set value 4AQ | Set value 4AR |
| | ...Omitted... | | | | | | | | | | | | | | | | |
| | Control parameter n | Set value 1AS | Set value 1AT | Set value 1AU | Set value 1AV | Set value 2AS | Set value 2AT | Set value 2AU | Set value 2AV | Set value 3AS | Set value 3AT | Set value 3AU | Set value 3AV | Set value 4AS | Set value 4AT | Set value 4AU | Set value 4AV |
| Noise reduction processing circuit N | Control parameter 1 | Set value 1AW | Set value 1AX | Set value 1AY | Set value 1AZ | Set value 2AW | Set value 2AX | Set value 2AY | Set value 2AZ | Set value 3AW | Set value 3AX | Set value 3AY | Set value 3AZ | Set value 4AW | Set value 4AX | Set value 4AY | Set value 4AZ |
| | Control parameter 2 | Set value 1BA | Set value 1BB | Set value 1BC | Set value 1BD | Set value 2BA | Set value 2BB | Set value 2BC | Set value 2BD | Set value 3BA | Set value 3BB | Set value 3BC | Set value 3BD | Set value 4BA | Set value 4BB | Set value 4BC | Set value 4BD |
| | Control parameter 3 | Set value 1BE | Set value 1BF | Set value 1BG | Set value 1BH | Set value 2BE | Set value 2BF | Set value 2BG | Set value 2BH | Set value 3BE | Set value 3BF | Set value 3BG | Set value 3BH | Set value 4BE | Set value 4BF | Set value 4BG | Set value 4BH |
| | Control parameter n | Set value 1BI | Set value 1BJ | Set value 1BK | Set value 1BL | Set value 2BI | Set value 2BJ | Set value 2BK | Set value 2BL | Set value 3BI | Set value 3BJ | Set value 3BK | Set value 3BL | Set value 4BI | Set value 4BJ | Set value 4BK | Set value 4BL |
| Defect correction | | | | | | | | | | | | | | | | | |
| | ...Omitted... | | | | | | | | | | | | | | | | |

# IMAGING DEVICE, IMAGING METHOD, ELECTRONIC DEVICE, AND SIGNAL PROCESSING DEVICE

CROSS REFERENCE TO RELATED APPLICATIONS

This application is a U.S. National Phase of International Patent Application No. PCT/JP2017/047372 filed on Dec. 28, 2017, which claims priority benefit of Japanese Patent Application No. JP 2017-003364 filed in the Japan Patent Office on Jan. 12, 2017. Each of the above-referenced applications is hereby incorporated herein by reference in its entirety.

TECHNICAL FIELD

The present technology relates to an imaging device, an imaging method, an electronic device, and a signal processing device, and particularly relates to an imaging device, an imaging method, an electronic device, and a signal processing device capable of reducing an amount of storing a set value and an interpolation operation amount thereof with respect to a configuration that reduces noise according to a noise amount.

BACKGROUND ART

Processing such as noise reduction (NR), image sharpening, pixel defect correction, etc. requires adjustment according to the amount of image noise or pixel defect to obtain high image quality image output. For example, when the amount of noise is large, the NR intensity is increased and the sharpening processing intensity is weakened. In addition, when the amount of noise is small, it is an adjustment to weaken the NR intensity and strengthen the sharpening processing.

It is known that the amount of noise increases and decreases depending on the Gain value of the image sensor and the temperature of the image sensor, and an optimum set value according to the amount of noise is set for each function.

Incidentally, even though the Gain value of the image sensor can be finely adjusted, when optimum set values corresponding to all adjustment values are held in a storage element, the amount becomes enormous. For this reason, in a proposed scheme, set values are stored for several points at predetermined intervals with respect to the Gain value of the image sensor, and when the set values are set in a section between stored Gain values, the set values are calculated by linear interpolation.

In addition, in a proposed scheme, in consideration of an increase in noise due to a temperature rise, an increase in the sensor gain for obtaining proper exposure is suppressed, and adjustment is made according to an f value and a shutter time by the amount (see Patent Literature 1).

Further, in a proposed scheme, a parameter allowing appropriate correction of noise increased by the temperature rise of the image sensor is calculated. That is, exposure control determined by a normal f value, a shutter, and sensor gain is used to calculate a parameter of correction processing such as NR by a simple method (see Patent Literature 2).

CITATION LIST

Patent Literature

Patent Literature 1: Japanese Patent Application Laid-open No. 2012-029194

Patent Literature 2: Japanese Patent Application Laid-open No. 2006-135425

DISCLOSURE OF INVENTION

Technical Problem

However, the amount of noise increases or decreases depending on the temperature of the image sensor in addition to the Gain value of the image sensor.

Even when the Gain value of the image sensor is low, if the temperature of the image sensor is high, the amount of noise increases.

However, even when the set value is calculated according to the Gain value of the image sensor, if the temperature is actually high, the set value in the case of being smaller than the actual noise amount is set. Therefore, when an interlocking mechanism similar to interlocking of the Gain value of the image sensor is included according to the temperature to avoid such a situation, the information amount of the set value held in the storage element increases, and computation becomes complicated.

In addition, in the case of the invention of Patent Literature 1, a camera that may not limit a shutter time or adjust an f value is present in cameras for moving image capturing, there is a limit to adjustment, and exposure control becomes complicated considering temperature information.

Further, in the case of the invention of Patent Literature 2, even though vertical strip noise can be removed, it is impossible to adjust setting of NR of a signal processing unit with respect to an increase of the noise amount of the whole screen at high temperature.

The present disclosure has been made in view of such circumstances, and in particular, has a set value necessary for processing for reducing noise according to the amount of noise and holds an offset amount according to temperature, thereby reducing an information amount of a set value to be stored and a load related to interpolation processing which are required for noise reduction.

Solution to Problem

An imaging device of an aspect of the present disclosure is an imaging device including an image sensor that captures an image, a Gain value acquisition unit that acquires a Gain value of the image sensor, a temperature value acquisition unit that acquires a temperature value of the image sensor, and a signal processing unit that performs signal processing on the image captured by the image sensor on the basis of the Gain value offset according to the temperature value.

The signal processing unit may include an image processing unit that performs predetermined image processing on the image, an offset amount calculation unit that calculates an offset amount of the Gain value on the basis of the temperature value, an addition unit that adds the offset amount to the Gain value acquired by the Gain value acquisition unit, and a set value generator that generates a set value to be used for the predetermined image processing in the image processing unit on the basis of the Gain value to which the offset amount is added by the addition unit, and the image processing unit may perform the predetermined image processing on the image on the basis of the set value.

The offset amount calculation unit may store offset amounts with respect to a plurality of temperature values corresponding to discrete values, and calculate an offset amount of the temperature value acquired by the temperature value acquisition unit by interpolation processing using a plurality of the stored temperature values.

The offset amount calculation unit may store offset amounts with respect to a plurality of temperature values corresponding to discrete values, and calculate an offset amount by linear interpolation using offset amounts with respect to temperature values before and after the temperature value acquired by the temperature value acquisition unit among a plurality of the stored temperature values.

The offset amount calculation unit may calculate an offset amount by interpolation using an nth degree polynomial having the temperature value as a variable.

The set value generator may store set values with respect to a plurality of Gain values corresponding to discrete values, and generate a set value by interpolation processing using a plurality of the stored set values.

The set value generator may store set values with respect to a plurality of Gain values corresponding to discrete values, and generate a set value by linear interpolation using set values with respect to Gain values before and after the Gain value acquired by the Gain value acquisition unit among a plurality of the stored set values.

The set value generator may generate a set value by interpolation using an nth degree polynomial having the Gain value as a variable.

In a case where a plurality of signal processing units is present, and each of the signal processing units performs different predetermined signal processing on the image, the offset amount calculation unit of each of a plurality of the signal processing units may store different offset amounts with respect to a plurality of temperature values corresponding to the discrete values, respectively.

In a case where there is a plurality of signal processing units, each of which performing different signal processing on the image, each of some signal processing units among a plurality of the signal processing units may include a first image processing unit that performs first image processing on the image, a first offset amount calculation unit that calculates a first offset amount of the Gain value on the basis of the temperature value, a first addition unit that adds the first offset amount to the Gain value acquired by the Gain value acquisition unit, and a first set value generator that generates a first set value to be used for the first image processing in the image processing unit on the basis of the Gain value to which the first offset amount is added by the first addition unit, the first image processing unit may perform the first image processing on the image on the basis of the first set value, each of some other signal processing units different from the some signal processing units among a plurality of the signal processing units may include a second image processing unit that performs second image processing on the image, a second offset amount calculation unit that calculates a second offset amount by multiplying a predetermined coefficient by the first offset amount calculated by the first offset amount calculation unit, a second addition unit that adds the second offset amount to the Gain value acquired by the Gain value acquisition unit, and a second set value generator that generates a second set value to be used for the second image processing in the second image processing unit on the basis of the Gain value to which the second offset amount is added by the second addition unit, and the second image processing unit may perform the second image processing on the image on the basis of the second set value.

An image method of an aspect of the present disclosure is an imaging method for an imaging device including an image sensor that captures an image, a Gain value acquisition unit that acquires a Gain value of the image sensor, and a temperature value acquisition unit that acquires a temperature value of the image sensor, the imaging method including a step of performing signal processing on the image captured by the image sensor on the basis of the Gain value offset according to the temperature value.

An electronic device of an aspect of the present disclosure is an electronic device including a Gain value acquisition unit that acquires a Gain value of the image sensor, a temperature value acquisition unit that acquires a temperature value of the image sensor, and a signal processing unit that performs signal processing on the image captured by the image sensor on the basis of the Gain value offset according to the temperature value.

A signal processing device an aspect of the present disclosure is a signal processing device including an image processing unit that performs predetermined image processing on an image captured by an image sensor, an offset amount calculation unit that calculates an offset amount of a Gain value of the image sensor on the basis of a temperature value of the image sensor, an addition unit that adds the offset amount to the Gain value of the image sensor, and a set value generator that generates a set value to be used for the predetermined image processing in the image processing unit on the basis of the Gain value to which the offset amount is added by the addition unit, in which the image processing unit performs the predetermined image processing on the image on the basis of the set value.

In an aspect of the present disclosure, a Gain value of an image sensor that captures an image is acquired, a temperature value of the image sensor is acquired, and signal processing is performed on the image captured by the image sensor on the basis of the Gain value offset according to the temperature value.

Advantageous Effects of Invention

According to an aspect of the present disclosure, it is possible to reduce an information amount of a set value to be stored and a load related to interpolation processing which are required for noise reduction.

BRIEF DESCRIPTION OF DRAWINGS

FIG. 2 is a diagram for description of an example of information to be held to calculate a set value with respect to a Gain value of an image sensor necessary for image processing.

FIG. 4 is a diagram for description of an example of information to be held to calculate a set value with respect to a Gain value of the image sensor for each temperature necessary for image processing.

MODE(S) FOR CARRYING OUT THE INVENTION

Figure 1:
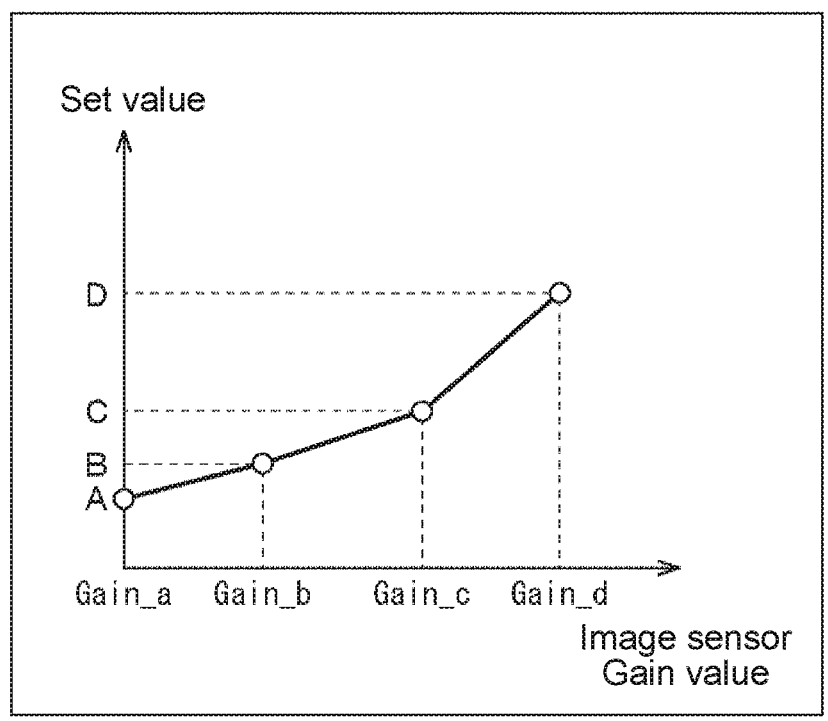
FIG. 1 is a diagram for description of an example of information to be held to calculate a set value with respect to a Gain value of an image sensor necessary for image processing.

Hereinafter, a desirable embodiment of the present disclosure will be described in detail below with reference to accompanying drawings. Note that in the present specification and the drawings, the same reference numerals are given to constituent elements having substantially the same functional configuration, and redundant descriptions are omitted.

<With Regard to Control Parameter Necessary for Image Processing>

A plurality of types of processing is present in image processing, for example, sharpening processing, noise reduction processing, defect correction processing, etc.

In general, in the above-described image processing, a set value is present for each of a plurality of control parameters set according to a Gain value in an amplifier circuit in an image sensor since a noise level generally increases due to an increase in the Gain value, and it is necessary to set a set value corresponding to a noise amount for a control parameter.

More specifically, for predetermined control parameters, for example, as illustrated in FIG. 1, set values A to D are set for gains Gain_a to Gain_d having discrete variables, respectively.

For this reason, for example, in a case in which a sharpening processing circuit, noise reduction processing circuits A to N, and a defect correction processing circuit are provided, and set values are set for control parameters 1 to n and points of gains Gain_a to Gain_d for each of image processing blocks, for example, set values need to be set as illustrated in FIG. 2. Note that set values A to BL in FIG. 2 are examples indicating types of set values.

In FIG. 2, set values for control parameters 1 to N are set for each of a total of (N+2) image processing blocks corresponding to the sharpening processing circuit, the noise reduction processing circuits A to N, and the defect correction processing circuit, and set values are set at the respective points of the gains Gain_a to Gain_d for the respective control parameters.

Therefore, in the case of FIG. 2, a table of $(4 \times n \times (N+2))$ set values need to be stored in a storage element, etc.

Then, set values of Gain values at two neighboring points are read from the table of the set values illustrated in FIG. 2 from Gain information of an image sensor in a frame to be processed, interpolation processing using the set values is executed to determine a set value, the set value is supplied to an image processing block to be controlled, and processing is executed by the image processing block. This processing is individually executed by a plurality of image processing blocks.

Note that when a process of determining a set value of a control parameter is executed at the timing of processing a captured image, parameter setting is switched in the middle of one frame of an image to be processed, a correction result differs before and after switching, and there is concern that continuity of the image in one frame may be broken. For this reason, it is necessary to prepare a parameter to be set until correction processing is started in advance. In other words, in the case of switching every frame setting, it is necessary to calculate a set parameter during one frame period at most, and it is desirable not to increase the number of parameters to be controlled not only from a viewpoint of storage element capacity but also from a viewpoint of processing time necessary for interpolation computation.

<Set Value Supply Processing in Case of Using Table of FIG. 2>

Figure 3:
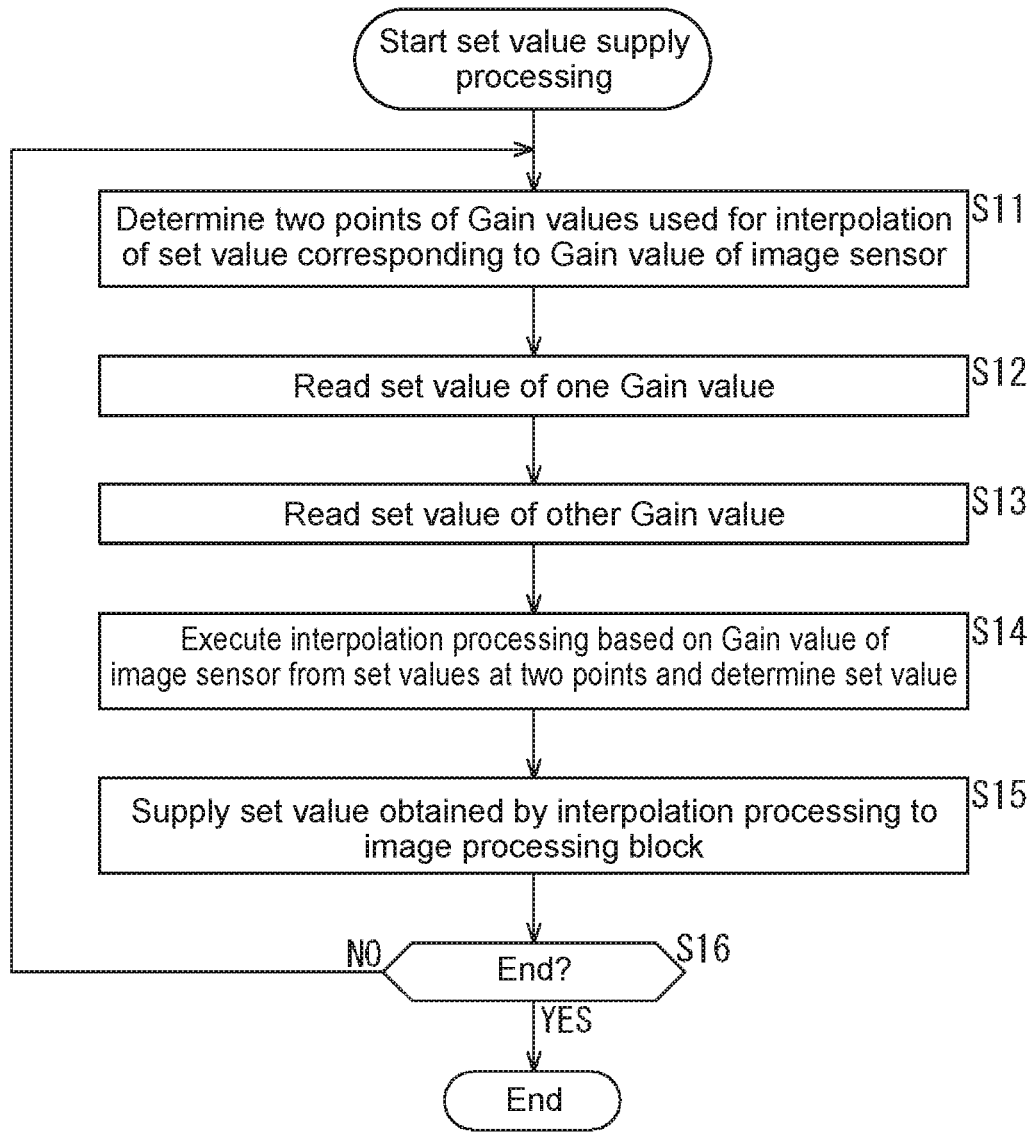
FIG. 3 is a flowchart for description of set value supply processing in image processing using the information of FIG. 2.

Here, a description will be given of specific set value supply processing of supplying a set value to an image processing block in the case of using the set value table of FIG. 2 with reference to a flowchart of FIG. 3. Note that processing of the flowchart of FIG. 3 describes set value supply processing in the case of using the table of FIG. 2 for control parameter 1 in the image processing block including the sharpening processing circuit. Naturally, for an image processing block other than the sharpening processing circuit and a control parameter other than control parameter 1, values of the table corresponding to each processing are used.

In step S11, Gain values at two neighboring points used for interpolation processing among Gain values on the table are determined from Gain values of the image sensor in the frame to be processed. For example, when a Gain value of the image sensor is an intermediate value between Gain_b and Gain_c on the table, Gain values at two neighboring points on the table used for interpolation processing are Gain_b and Gain_c. In the case of other values, Gain values at two front and back neighboring points are set.

In step S12, a set value corresponding to one Gain value at two neighboring points of Gain values of the image sensor is read. That is, here, a set value B of Gain_b corresponding to one Gain value at two neighboring points of Gain values is read.

In step S13, a set value corresponding to the other Gain value at the two neighboring points of the Gain values of the image sensor is read. That is, here, a set value C of Gain_c corresponding to the other Gain value at two neighboring points of Gain values is read.

In step S14, interpolation processing is executed using the set values of the Gain values at the two neighboring points of the Gain values of the image sensor. That is, here, since the image sensor Gain value is an intermediate value between Gain_b and Gain_c, an intermediate value of set values B and C is obtained as an interpolation value of the set value.

In step S15, the obtained interpolation value is output as the set value. That is, here, the intermediate value of the set values B and C is output as the interpolation value of the set value.

In step S16, it is determined whether an end of processing is commanded. When the end of processing is not commanded, the process returns to step S11, and subsequent processes are repeated. Then, in step S16, when the end of processing is commanded, the process is ended.

Through the above processing, the set values are set according to the Gain values of the image sensor and supplied to the image processing block.

<With Regard to Control Parameter Corresponding to Temperature Value of Image Sensor>

Further, in the case of considering an influence of the noise amount due to a temperature value of the image sensor, for example, in the case of saving optimum set values of each image processing block for temperature values of four points corresponding to low temperature [temperature_1], medium/low temperature [temperature_2], medium/high temperature [temperature_3], and high temperature [temperature_4] in the storage element, set values of the information amount illustrated in FIG. 4 need to be stored. That is, since the information amount of FIG. 2 is needed for each of temperature values of four points, the information amount of FIG. 4 to be stored in the storage element is four times the information amount of FIG. 2.

In the case of considering the temperature of the image sensor, set values of respective control parameters of each image processing block are calculated from the set values saved in the storage element illustrated in FIG. 4.

<Set Value Supply Processing in Case of Using Table of FIG. 4>

Figure 5:
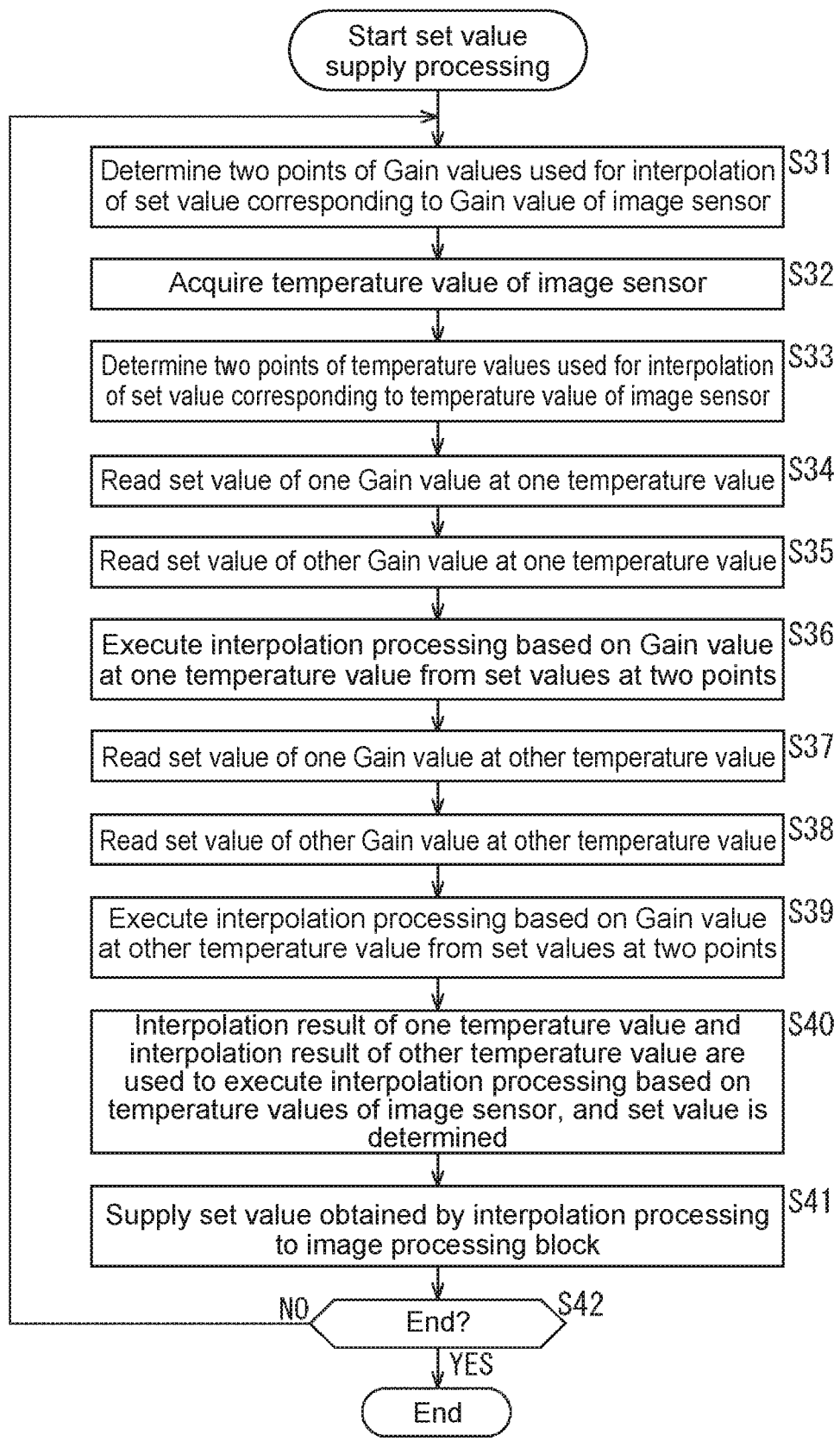
FIG. 5 is a flowchart for description of set value supply processing in image processing using information of FIG. 3.

Here, a description will be given of specific set value supply processing in the case of using the table of the set values of FIG. 4 with reference to a flowchart of FIG. 5. Note that processing of the flowchart of FIG. 5 executes set value supply processing in the case of using the table of FIG. 4 with respect to control parameter 1 in the sharpening processing circuit. Naturally, with regard to image processing other than the sharpening processing circuit and control parameters other than control parameter 1, values of the table corresponding to each process are used.

In addition, here, a description is given of a method of calculating control parameter 1 of the image processing block included in the sharpening processing circuit in a case in which an image sensor Gain value is a Gain value in the middle of point Gain_b and point Gain_c, and a temperature value of the image sensor is a temperature value in the middle of [temperature_1] and [temperature_2].

In step S31, Gain values at two neighboring points used for interpolation processing are determined from Gain information of the image sensor in a frame to be processed. For example, here, a Gain value is an intermediate value between Gain_b and Gain_c. In the case of other values, values at two front and back neighboring points of each of the values are set.

In step S32, a temperature value of the image sensor is acquired.

In step S33, temperature values at two neighboring points used for interpolation processing are determined from a temperature measurement result of the image sensor in the frame to be processed. For example, here, a temperature value of the image sensor obtained from the measurement result is a temperature value in the middle of [temperature_1] and [temperature_2], and thus neighboring temperature values used for interpolation processing are temperature values [temperature_1] and [temperature_2]. Note that when the temperature value of the image sensor is another temperature value, temperature values on the table before and after the temperature value of the image sensor are set as temperature values at two neighboring points.

In step S34, a set value of one Gain value at two neighboring points of the Gain value of the image sensor at one temperature value is read. That is, here, a set value 1B which is a set value of Gain_b corresponding to one Gain value at two neighboring points of the Gain value of the image sensor at [temperature_1] corresponding to one temperature value is read.

In step S35, a set value of the other Gain value at the two neighboring points of the Gain value of the image sensor at the one temperature value is read. That is, here, a set value 1C which is a set value of Gain_c corresponding to the other Gain value at the two neighboring points of the Gain value at the temperature value [temperature_1] is read.

In step S36, the set values of the Gain values at the two neighboring points of the Gain value of the image sensor at the one temperature value are used to execute interpolation processing based on the Gain value of the one temperature value. That is, here, since the set values 1B and 1C are used and the Gain value of the image sensor at one temperature value is an intermediate value between Gain_b and Gain_c, a set value [1B, 1C] which is an intermediate value of set values 1B and 1C is obtained as an interpolated value of the one temperature value [temperature_1].

In step S37, a set value of one Gain value at the two neighboring points of the Gain value of the image sensor at the other temperature value is read. That is, here, a set value 2B which is a set value of Gain_b corresponding to one Gain value at the two neighboring points of the Gain value of the image sensor at the temperature value [temperature_2] which is the other temperature value is read.

In step S38, a set value of the other Gain value at the two neighboring points of the Gain value of the image sensor at the other temperature value is read. That is, here, a set value 2C which is a set value of Gain_c corresponding to the other Gain value at the two neighboring points of the Gain value of the image sensor at the temperature value [temperature_2] which is the other temperature value is read.

In step S39, the set values of the Gain values at the two neighboring points of the Gain value of the image sensor at the other temperature value are used to execute interpolation processing based on the Gain value. That is, here, since the set values 2B and 2C are used and the Gain value of the image sensor at the other temperature value is an intermediate value between Gain_b and Gain_c, a set value [2B, 2C] which is an intermediate value of the set values 2B and 2C is obtained as an interpolated value of the temperature value [temperature_2].

In step S40, a set value corresponding to an interpolation value of one temperature and a set value corresponding to an interpolation value of the other temperature are used to execute interpolation processing based on the temperature values of the image sensor, and an interpolation result is obtained as control parameter 1. That is, here, since the temperature value is a temperature value in the middle of temperature values [temperature_1] and [temperature_2], an intermediate value between a set value [1B, 1C] corresponding to an interpolation value of [temperature_1] and a set value [2B, 2C] corresponding to an interpolation value of [temperature_2] is obtained as a set value of control parameter 1.

In step S41, the obtained interpolation value is output to the image processing block as a set value. That is, here, the intermediate value between the set value [1B, 1C] and the set value [2B, 2C] is output to the image processing block as an interpolation value.

In step S42, it is determined whether an end of processing is commanded. When the end of processing is not commanded, the process returns to step S31, and subsequent processes are repeated. Then, in step S42, when the end of processing is commanded, the process is ended.

Through the above processing, set values are set according to the Gain values and the temperature values of the image sensor and supplied to the image processing block.

That is, when interpolation processing using the table of FIG. 4 is compared with interpolation processing using the table of FIG. 2, the amount of parameter values to be read is doubled, the amount of interpolation processing is tripled, and the amount of parameter setting information saved in the storage element is quadrupled.

Note that in the above-described processing, a description has been given of an example in which interpolation processing by temperature values is performed after interpolation processing by Gain values is performed. However, interpolation processing by Gain values may be performed after interpolation processing by temperature values is performed.

In both cases, not only the information amount of the set value saved in the storage element increases, but also the read amount of the set value and the interpolation processing amount for calculating the control parameter to be set in each image processing block increase considering the temperature value of the image sensor.

<First Embodiment of Imaging Device of Present Disclosure>

The imaging device of the present disclosure realizes correction based on a Gain value and correction based on a temperature value while suppressing the amount of set values saved in the storage element. Here, a description will be given of a first embodiment of the imaging device of the present disclosure with reference to FIG. 6.

Figure 6:
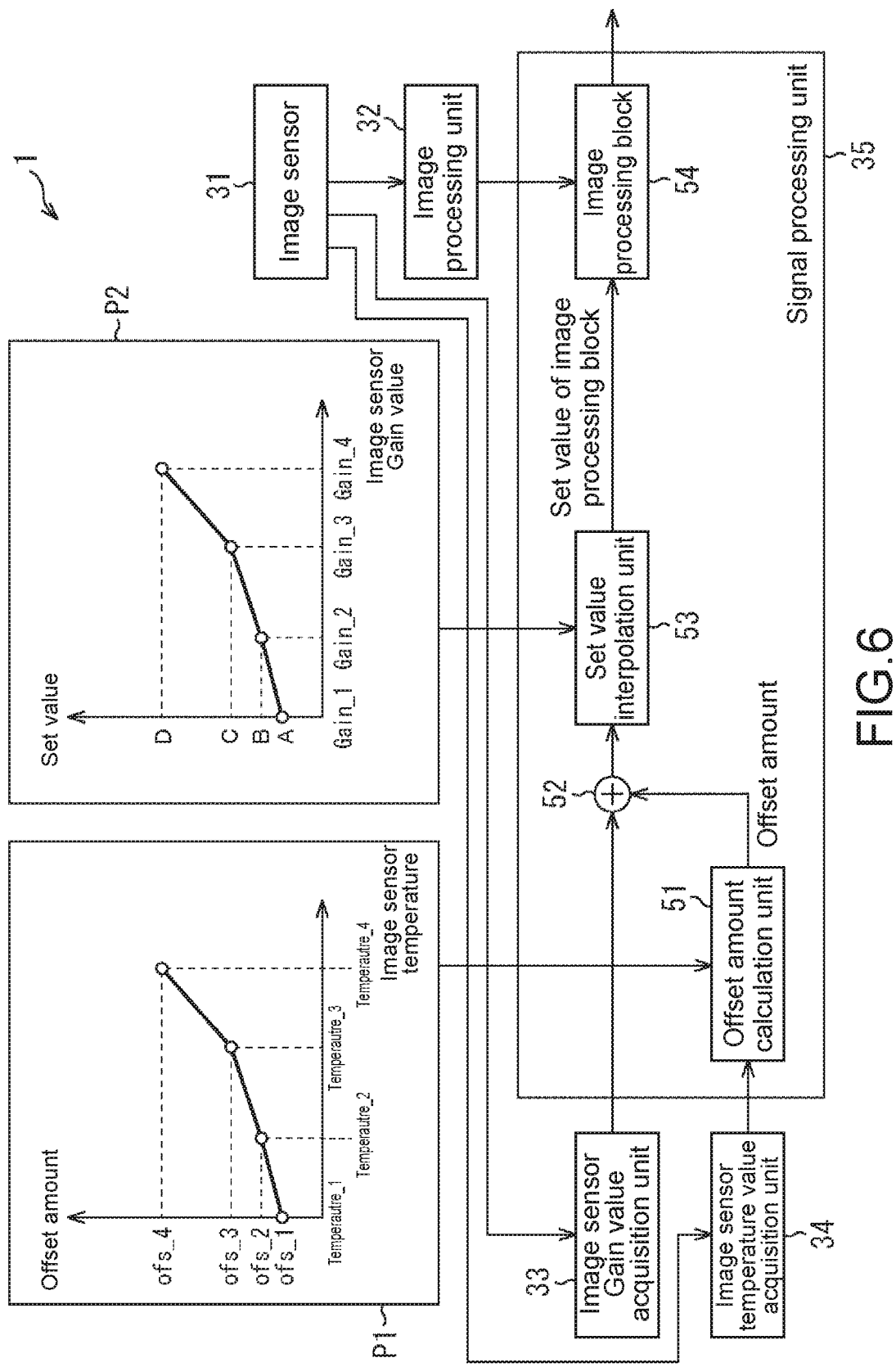
FIG. 6 is a diagram for description of a configuration example of a first embodiment of an imaging device of the present disclosure.

An imaging device 1 of FIG. 6 includes an image sensor 31, an image processing unit 32, an image sensor Gain value acquisition unit 33, an image sensor temperature value acquisition unit 34, and a signal processing unit 35.

The image sensor 31 includes a complementary metal oxide semiconductor (CMOS), a charge coupled device (CCD), etc., generates charges according to the amount of incident light by photoelectric conversion in pixel units, and supplies an image including a pixel signal based on the generated charges to the signal processing unit 35.

The image processing unit 32 performs predetermined processing on an image captured by the image sensor 31 and outputs the processed image to the signal processing unit 35.

The image sensor Gain value acquisition unit 33 acquires a Gain value of the image sensor 31 and supplies the acquired Gain value to the signal processing unit 35 as an image sensor Gain value.

The image sensor temperature value acquisition unit 34 supplies an image sensor temperature value corresponding to a set value of a temperature of the image sensor 31 to the signal processing unit 35.

The signal processing unit 35 performs signal processing on the pixel signal of the image supplied from the image processing unit 32 on the basis of the image sensor Gain value supplied from the image sensor Gain value acquisition unit 33 and the image sensor temperature value supplied from the image sensor temperature value acquisition unit 34, and outputs the processed pixel signal to a device at a subsequent stage (not illustrated).

The signal processing unit 35 includes an offset amount calculation unit 51, an addition unit 52, a set value interpolation unit 53, and an image processing block 54.

For example, the offset amount calculation unit 51 stores an offset amount of a Gain value with respect to a temperature value of the image sensor illustrated by information P1 of FIG. 6 in a built-in storage element (not illustrated), calculates the offset amount on the basis of the image sensor temperature value supplied from the image sensor temperature value acquisition unit 33, and outputs the calculated offset amount to the addition unit 52. The information P1 of FIG. 6 illustrates that offset amounts ofs_1 to ofs_4 of the image sensor Gain values with respect to the image sensor temperature values are stored for four temperature values [temperature_1] to [temperature_4] having discrete amounts.

The offset amount of the temperature value between the four respective points is calculated by the offset amount calculation unit 51 by interpolation using the stored offset amounts with respect to the temperatures at the four points, and output to the addition unit 52.

That is, the offset amount calculation unit 51 does not store offset amounts with respect to all temperature values and stores, for example, offset amounts ofs_1 to ofs_4 with respect to discretely set temperature values [temperature_1] to [temperature_4] at four points, and offset amounts with respect to temperature values between the four points are obtained by interpolation using the offset amounts with respect to the temperature values at the four points. More specifically, when the temperature value of the image sensor is an intermediate value between [temperature_1] and [temperature_2], for example, the offset amount calculation unit 51 sets an intermediate value between offset amounts ofs_1 and ofs_2 as an offset amount by interpolation using offset amounts ofs_1 and ofs_2 of [temperature_1] and [temperature_2].

The addition unit 52 adds the offset amount supplied from the offset amount calculation unit 51 to the Gain value supplied from the Gain value acquisition unit 32, and supplies the added value to the set value interpolation unit 53.

For example, the set value interpolation unit 53 stores a set value set in image processing in the image processing block 54 with respect to the Gain value illustrated by information P2 of FIG. 6 in a built-in storage element (not illustrated), calculates the set value on the basis of the image sensor Gain value supplied from the addition unit 52, and supplies the calculated set value to the image processing block 54.

The information P2 of FIG. 6 illustrates that set values [set value_A] to [set value_D] set in the image processing block 54 with respect to the image sensor Gain values are stored for Gain values [Gain_1] to [Gain_4] at four points. The set value of the Gain value between the four respective points is calculated by the set value interpolation unit 53 by interpolation using the stored set values [set value_A] to [set value_D] with respect to the Gain values [Gain_1] to [Gain_4] at the four points, and output to the image processing block 54.

That is, the set value interpolation unit 53 does not store set values with respect to all Gain values and stores, for example, the set values [set value_A] to [set value_D] with respect to the Gain values [Gain_1] to [Gain_4] at the four points, and the set values with respect to Gain values between the four points are obtained by interpolation using the set values with respect to the Gain values at the four points. More specifically, when the Gain value of the image sensor is an intermediate value between [Gain_1] and [Gain_2], for example, the set value interpolation unit 53 sets an intermediate value between the set values [set value_A] and [set value_B] as a set value by interpolation using the set values [set value_A] and [set value_B] of [Gain_1] and [Gain 2].

The image processing block 54 performs image processing based on the set value supplied from the set value interpolation unit 53 on a pixel signal of each pixel of the image supplied from the image sensor 31, and outputs the processed pixel signal to a component at a subsequent stage (not illustrated). Examples of specific image processing performed by the image processing block 54 include sharpening processing, noise reduction processing, and defect correction processing.

Note that a description has been given of an example in which the information P1 stored by the offset amount calculation unit 51 and the information P2 stored in the set value interpolation unit 53 correspond to the offset amounts with respect to the discretely set temperature values at the four points and the set values with respect to the discretely set Gain values at the four points. However, another number of points may be adopted. However, when the number of points of set values to be stored increases, there is concern that the capacity of the storage element required for the information P1 and the information P2 may be increased, and thus it is desirable to have a minimum necessary amount as much as possible.

In addition, in the following, a Gain value acquired by the image sensor Gain value acquisition unit 32 is referred to as an image sensor Gain value, and a temperature value acquired by the image sensor temperature value acquisition unit 34 is referred to as an image sensor temperature value. Further, a Gain value and a temperature value, set values thereof are set, in the information P1 stored by the offset amount calculation unit 51 and the information P2 stored in the set value interpolation unit 53 are simply referred to as a Gain value and a temperature value.

<Set Value Supply Processing by Imaging Device of FIG. 6>

Next, a description will be given of set value supply processing by the imaging device 1 of FIG. 6 with reference to a flowchart of FIG. 7.

In step S71, the image sensor temperature value acquisition unit 34 measures a temperature value of the image sensor 31, acquires a measurement result as an image sensor temperature value, and outputs the acquired measurement result to the offset amount calculation unit 51.

In step S72, the offset amount calculation unit 51 determines two points of temperature values used for interpolation on the basis of the acquired image sensor temperature value. That is, for example, when the acquired image sensor temperature value is a temperature value corresponding to an intermediate value between temperature values [temperature_1] and [temperature_2], the temperature values [temperature_1] and [temperature_2] are determined as the temperature values used for interpolation.

In step S73, the offset amount calculation unit 51 reads an offset amount with respect to one temperature value of the temperature values at the two points used for interpolation on the basis of the information P1 stored in the storage element. That is, for example, when the one temperature value is the temperature value [temperature_1], the offset amount calculation unit 51 reads an offset amount oft_1 with respect to the temperature value [temperature_1].

In step S74, the offset amount calculation unit 51 reads an offset amount with respect to the other temperature value of the temperature values at the two points used for interpolation on the basis of the information P1 stored in the storage element. That is, for example, when the other temperature value is the temperature value [temperature_2], the offset amount calculation unit 51 reads an offset amount oft_2 with respect to the temperature value [temperature_2].

In step S75, the offset amount calculation unit 51 determines an offset value by interpolation processing based on the acquired image sensor temperature value using the respective read offset amounts of the temperature values at the two points, and supplies the determined offset value to the addition unit 52. That is, for example, when the acquired image sensor temperature value is an intermediate value between the temperature values [temperature_1] and [temperature_2], the offset amount calculation unit 51 obtains an intermediate value of the offset amounts oft_1 and oft_2 by interpolation processing and determines the obtained intermediate value as an offset amount with respect to the acquired image sensor temperature value.

In step S76, the addition unit 52 adds the offset amount obtained by interpolation processing to an image sensor Gain value acquired by the Gain value acquisition unit 32 and outputs a resultant value to the set value interpolation unit 53.

In step S77, the set value interpolation unit 53 determines Gain values at two points used for interpolation on the basis of the acquired image sensor Gain value. That is, for example, when the acquired image sensor Gain value is an intermediate value between Gain values [Gain_1] and [Gain_2], the Gain values [Gain_1] and [Gain_2] are determined as the Gain values used for interpolation.

In step S78, the set value interpolation unit 53 reads a set value with respect to one Gain value of the Gain values at the two points used for interpolation on the basis of the information P2 stored in the storage element. That is, for example, when the one Gain value is the Gain value [Gain_1], the set value interpolation unit 53 reads a set value A with respect to the Gain value [Gain_1].

In step S79, the set value interpolation unit 53 reads a set value with respect to the other Gain value of the Gain values at the two points used for interpolation on the basis of the information P2 stored in the storage element. That is, for example, when the other Gain value is the Gain value [Gain_2], the set value interpolation unit 53 reads a set value B with respect to the Gain value [Gain_2].

In step S80, the set value interpolation unit 53 determines a set value by interpolation processing based on the acquired image sensor Gain value using the respective read set values of the Gain values at the two points. That is, for example, when the acquired image sensor Gain value is the intermediate value between the Gain values [Gain_1] and [Gain_2], the set value interpolation unit 53 obtains an intermediate value of the set values A and B by interpolation processing and determines the obtained intermediate value as a set value with respect to the acquired Gain value.

In step S81, the set value interpolation unit 53 outputs the set value obtained by interpolation processing to the image processing block 54. By this processing, the image processing block 54 performs image processing corresponding to the set values supplied from the set value interpolation unit 53 on an image signal supplied from the image processing unit 32.

In step S82, it is determined whether an end of processing is commanded. When the end of processing is not commanded, the process returns to step S71, and subsequent processes are repeated. Then, in step S82, when the end of processing is commanded, the process is ended.

Through the above processing, the image processing block 54 performs necessary image processing on the image supplied from the image processing unit 32 according to repeatedly output set values.

In this way, with regard to the amount of information stored in the storage elements of the offset amount calculation unit 51 and the set value interpolation unit 53, for example, as illustrated in FIG. 2, when an offset amount corresponding to a Gain value is set by, for example, four points for each control parameter, information about the offset amount merely increases by four points with respect to a temperature value, and it is possible to suppress an increase in the information amount illustrated in FIG. 4. In addition, with regard to a processing load related to interpolation processing, processing for the temperature is merely executed once, and thus it is possible to suppress an increase in the processing load.

As a result, even in the case of configuring a signal processing unit not considering the influence of the temperature value of the image sensor, it is possible to realize image processing considering the image sensor temperature value by adding a small storage area and interpolation processing.

<Second Embodiment of Imaging Device of Present Disclosure>

In the above description, a description has been given of an example of obtaining interpolation processing of the offset amount corresponding to the image sensor temperature value or the set value corresponding to the image sensor Gain value by linear interpolation. However, interpolation processing may correspond to other processing, and may be obtained by, for example, an nth degree polynomial (n is an integer of 1 or more).

Figure 8:
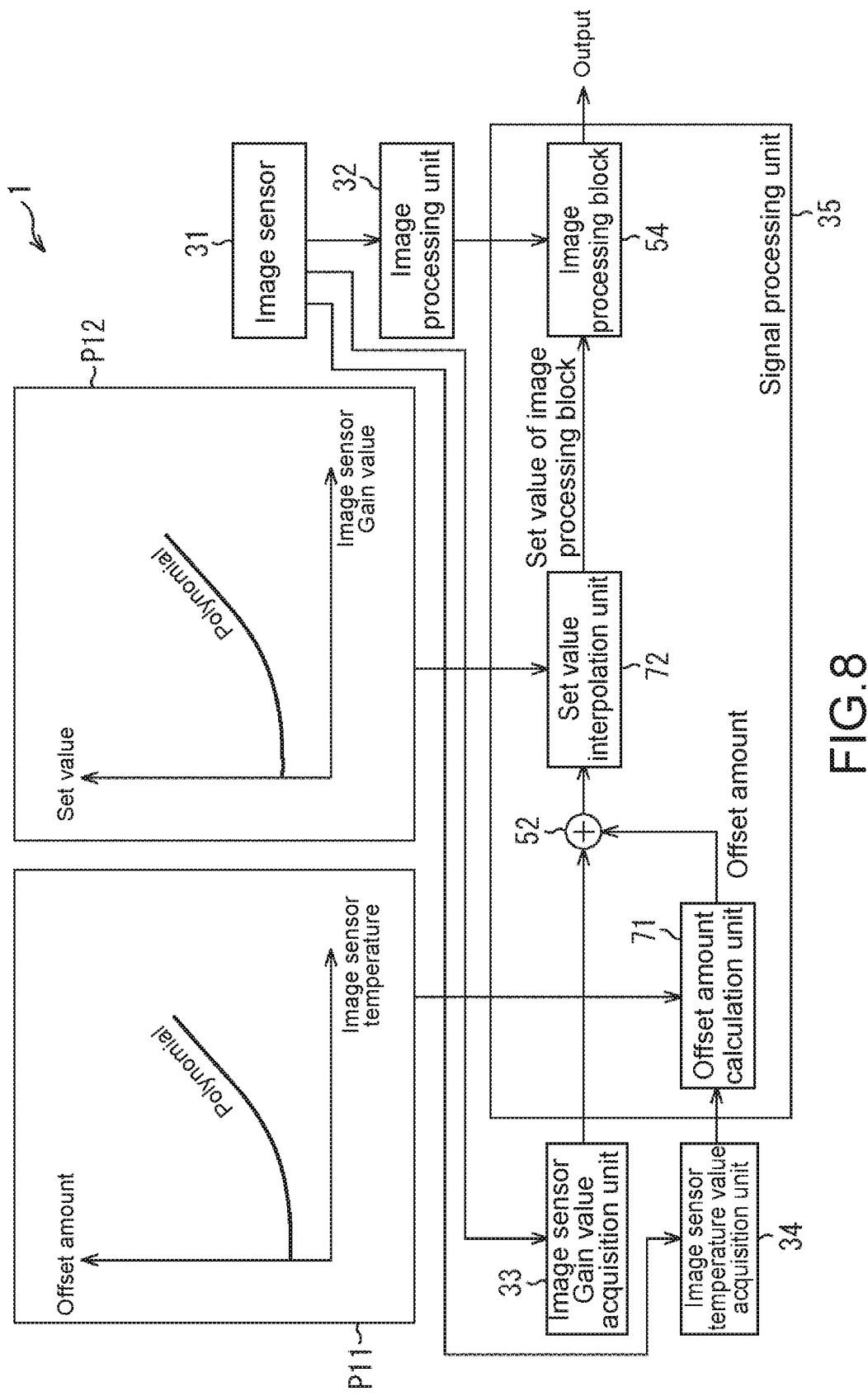
FIG. 8 is a diagram for description of a configuration example of a second embodiment of the imaging device of the present disclosure.

FIG. 8 illustrates a configuration example of the imaging device in which interpolation processing of the offset amount corresponding to the image sensor temperature value or the set value corresponding to the image sensor Gain value by the nth degree polynomial. Note that in a configuration of the imaging device 1 of FIG. 8, the same reference numeral will be attached to a component having the same function as that of a component in the imaging device 1 of FIG. 6, and a description thereof will be appropriately omitted.

In more detail, the imaging device 1 of FIG. 8 is different from the imaging device 1 of FIG. 6 in that an offset amount calculation unit 71 and a set value interpolation unit 72 are provided instead of the offset amount calculation unit 51 and the set value interpolation unit 53.

A basic function of the offset amount calculation unit 71 is substantially the same as that of the offset amount calculation unit 51. However, an offset amount corresponding to an image sensor temperature value is obtained not by linear interpolation and by, for example, an nth degree polynomial shown in the following Equation (1).

[Equation 1]

$$n\text{th degree polynomial: } f(x) = a_0 + a_1 x + a_2 x^2 + \ldots + a_n x^n) \quad (1)$$

Here, $a_0, a_1, a_2, \ldots, a_n$ are coefficients of the polynomial, and obtained by, for example, a least squares method. In addition, x is an image sensor temperature value.

As illustrated by information P11 of FIG. 8, the offset amount calculation unit 71 stores coefficients of an nth degree polynomial obtaining an offset amount with respect to a temperature value in a built-in storage element (not illustrated), and calculates an offset value corresponding to a temperature value using the coefficients.

A basic function of the set value interpolation unit 72 is substantially the same as that of the set value interpolation unit 53. However, a set value corresponding to a Gain value is obtained not by linear interpolation and by, for example, the nth degree polynomial shown in the above Equation (1). However, in the case of the set value interpolation unit 72, coefficients are different from those of the offset amount calculation unit 71 and x corresponds to a Gain value.

<Set Value Supply Processing by Imaging Device of FIG. 8>

Figure 9:
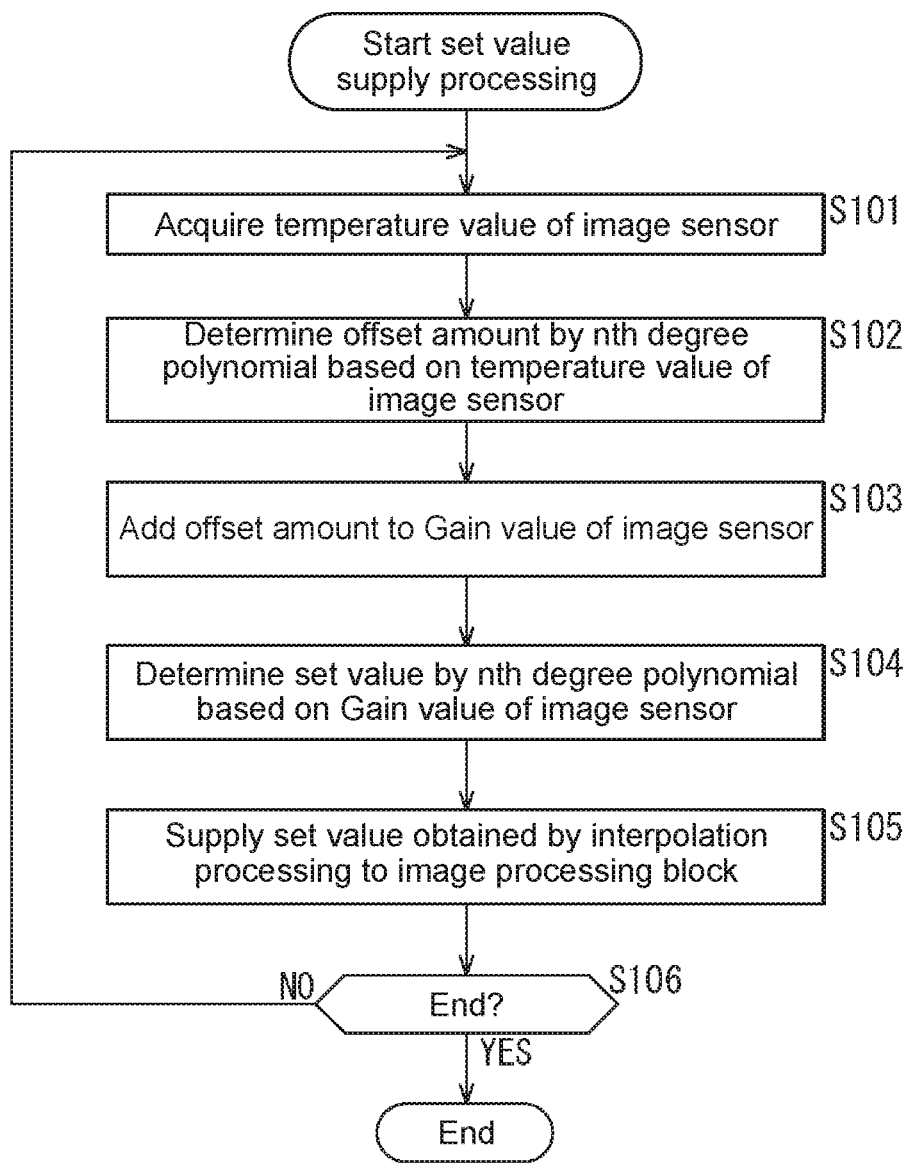
FIG. 9 is a flowchart for description of set value supply processing in image processing by the imaging device of FIG. 8.

Next, a description will be given of set value supply processing by the imaging device of FIG. 8 with reference to a flowchart of FIG. 9.

In step S101, the image sensor temperature value acquisition unit 34 measures a temperature of the image sensor 31, acquires a measurement result as an image sensor temperature value, and outputs the acquired measurement result to the offset amount calculation unit 71.

In step S102, the offset amount calculation unit 71 calculates and determines an offset amount by interpolation processing using the nth degree polynomial by the acquired image sensor temperature value.

In step S103, the addition unit 52 adds the offset amount obtained by interpolation processing to the image sensor Gain value acquired by the Gain value acquisition unit 32 and outputs a resultant value to the set value interpolation unit 72.

In step S104, the set value interpolation unit 72 calculates and determines a set value by interpolation processing using the nth degree polynomial by the image sensor Gain value.

In step S105, the set value interpolation unit 72 outputs the set value obtained by interpolation processing to the image processing block 54.

In step S106, it is determined whether an end of processing is commanded. When the end of processing is not commanded, the process returns to step S101, and subsequent processes are repeated. Then, in step S106, when the end of processing is commanded, the process is ended.

Through the above processing, the image processing block 54 performs necessary image processing on the image supplied from the image processing unit 32 according to the repeatedly output set values.

In this way, it is possible to suppress the increase in the information amount and the processing load stored in the storage elements of the offset amount calculation unit 71 and the set value interpolation unit 72.

As a result, even in the case of configuring a signal processing unit not considering the influence of the temperature, it is possible to realize image processing corresponding to the image sensor temperature value by adding a small storage area and interpolation processing.

<Third Embodiment of Imaging Device of Present Disclosure>

In the above description, a description has been given of an example in which one signal processing unit 35 is provided. However, a plurality of signal processing units may be present. In a case in which different offset values correspond to respective image sensor temperature values, interpolation processing corresponding to each of the values may be executed.

Figure 10:
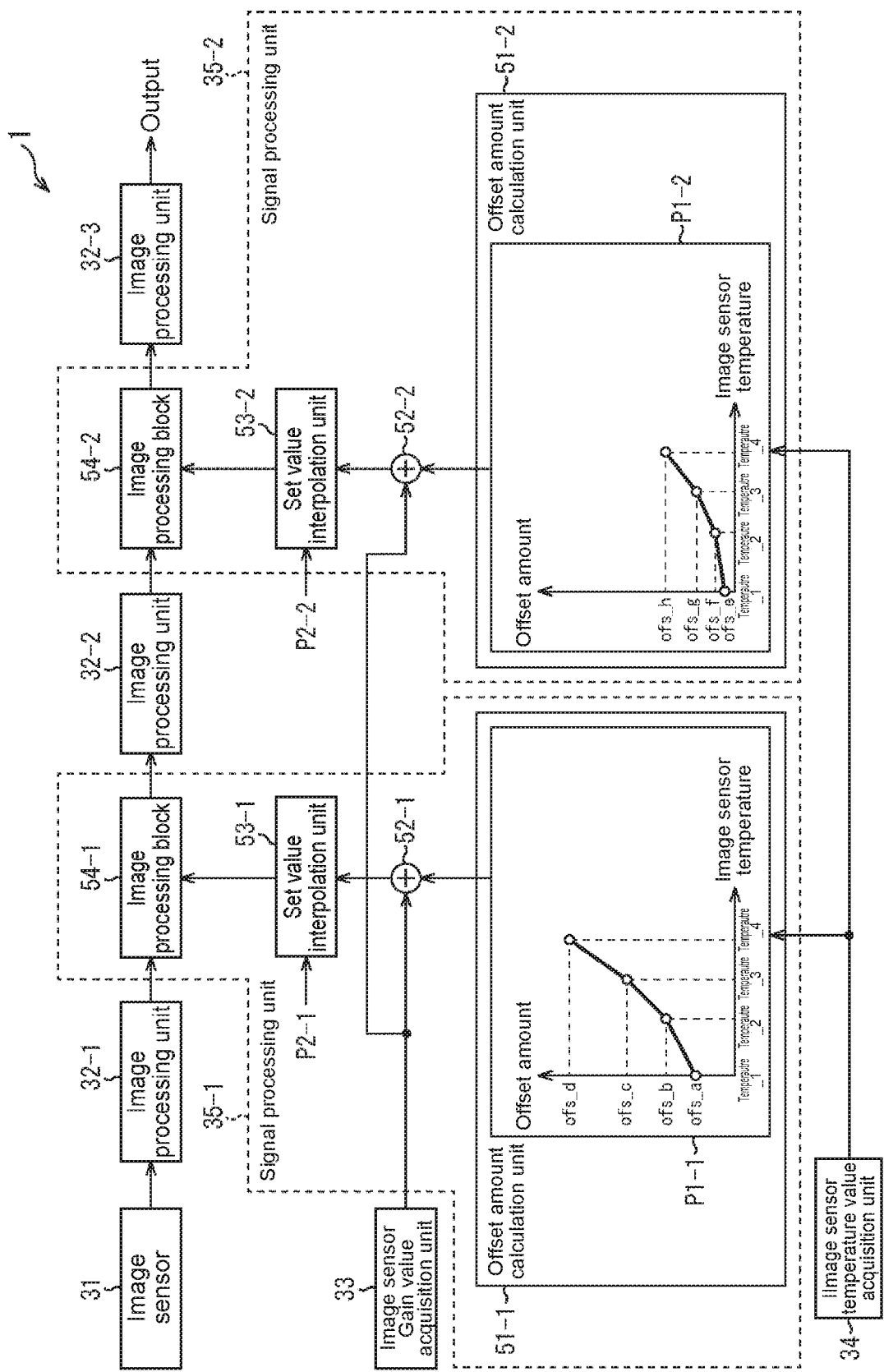
FIG. 10 is a diagram for description of a configuration example of a third embodiment of the imaging device of the present disclosure.

FIG. 10 illustrates an example of the imaging device 1 in the case of providing a plurality of signal processing units 35.

The imaging device 1 of FIG. 10 includes the image sensor 31, image processing units 32-1 to 32-3, and signal processing units 35-1 and 35-2. The image processing units 32-1 to 32-3 have the same configuration as that of the image processing unit 32, and the signal processing units 35-1 and 35-2 have the same configuration as that of the signal processing unit 35.

More specifically, the image processing unit 32-1 performs predetermined image processing on an image captured by the image sensor 31 and supplies the processed image to the signal processing unit 35-1.

The signal processing unit 35-1 executes predetermined signal processing on an image from the image processing unit 32-1 and outputs the processed image to the image processing unit 32-2.

The image processing unit 32-2 performs predetermined image processing on an image captured by the signal processing unit 35-1 and supplies the processed image to the signal processing unit 35-2.

The signal processing unit 35-2 executes predetermined signal processing on an image from the image processing unit 32-2 and outputs the processed image to the image processing unit 32-3.

The image processing unit 32-3 performs predetermined image processing on an image captured by the signal processing unit 35-2 and outputs the processed image to a component at a subsequent stage (not illustrated).

Here, the signal processing units 35-1 and 35-2 include offset amount calculation units 51-1 and 51-2, addition units 52-1 and 52-2, set value interpolation units 53-1 and 53-2, and image processing blocks 54-1 and 54-2, respectively. Basic configurations of the offset amount calculation units 51-1 and 51-2, the addition units 52-1 and 52-2, the set value interpolation units 53-1 and 53-2, and the image processing blocks 54-1 and 54-2 are the same as those of the offset amount calculation unit 51, the addition unit 52, the set value interpolation unit 53, and the image processing block 54, respectively.

However, the image processing blocks 54-1 and 54-2 function as different processes, that is, for example, different sharpening processing circuits, different noise reduction circuits, or different defect processing circuits, respectively. To correspond to each image processing, for example, pieces of information of offset amounts with respect to image sensor temperature values stored in storage elements (not illustrated) of the offset amount calculation units 51-1 and 51-2 are stored as different pieces of information as illustrated by information P1-1 and information P1-2 of FIG. 10.

That is, in the information P1-1, an offset amount with respect to a temperature value [temperature_1] is an offset amount ofs_a, an offset amount with respect to a temperature value [temperature_2] is an offset amount ofs_b, an offset amount with respect to a temperature value [temperature_3] is an offset amount ofs_c, and an offset amount with respect to a temperature value [temperature_4] is an offset amount ofs_d.

On the other hand, in the information P1-2, an offset amount with respect to the temperature value [temperature_1] is an offset amount ofs_e, an offset amount with respect to the temperature value [temperature_2] is an offset amount ofs_f, an offset amount with respect to the temperature value [temperature_3] is an offset amount ofs_g, and an offset amount with respect to the temperature value [temperature_4] is an offset amount ofs_h.

The imaging device 1 of FIG. 10 has a configuration in which the signal processing unit 35-1 previously performs signal processing on an image from the image sensor 31, and the signal processing unit 35-2 further performs signal processing on a processing result thereof through another image processing. In such a case, the signal processing unit 35-2 may be less susceptible to noise fluctuation due to an image sensor temperature value than the signal processing unit 35-1. Therefore, in such a case, by holding the offset amount of the Gain value according to the image sensor temperature value in each of the signal processing units 35-1 and 35-2, and adding different offset values to Gain values, respectively, it is possible to independently control an influence of the signal processing unit 35-1 and the signal processing unit 35-2 on the image sensor temperature value.

With regard to the set value interpolation units 53-1 and 53-2, similarly to the information P1-1 and the information P1-2 in the offset amount calculation units 51-1 and 51-2, information P2-1 and information P2-2 are stored in built-in storage elements (not illustrated), and information having a table of set values with respect to different Gain values may be stored.

Figure 7:
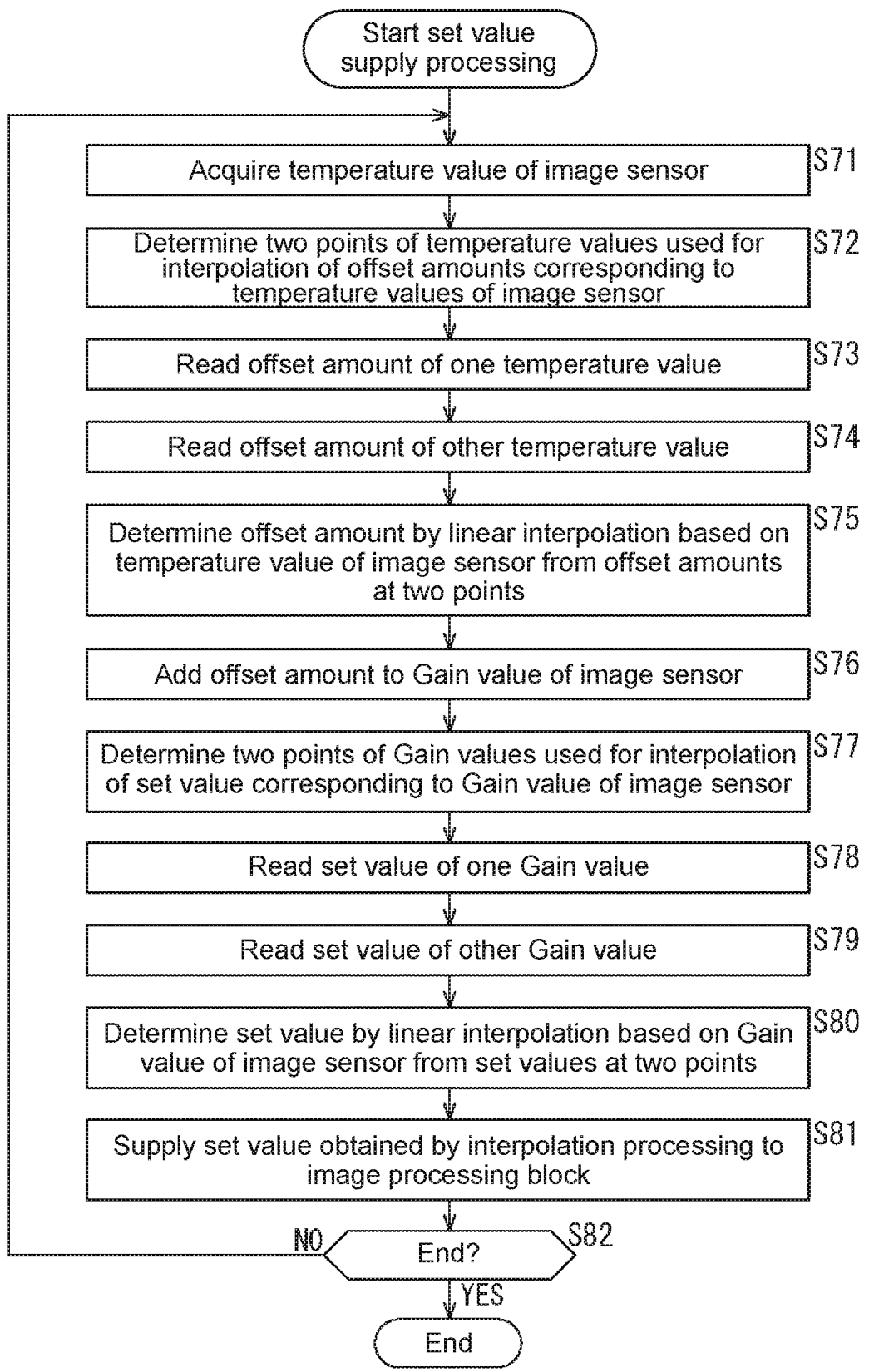
FIG. 7 is a flowchart for description of set value supply processing in image processing by the imaging device of FIG. 6.

Note that processing of each of the signal processing units 35-1 and 35-2 is similar to processing of FIG. 7, and thus a description thereof will be omitted. In addition, with regard to the offset amount, it is possible to adopt an interpolation method other than linear interpolation, for example, it is possible to adopt an interpolation method using the nth degree polynomial described with reference to FIG. 8 and FIG. 9.

<Fourth Embodiment of Imaging Device of Present Disclosure>

In the above description, an example has been described in which when a plurality of signal processing units 35 is present, and different offset amounts correspond to respective temperature values, interpolation processing using the different offset amounts is executed. However, when an offset amount of one signal processing unit 35 is a constant multiple of an offset amount of another signal processing unit 35, the other signal processing unit 35 may multiply the offset amount of the one signal processing unit 35 by a constant, and use a resultant value as the offset amount of the other signal processing unit 35.

Figure 11:
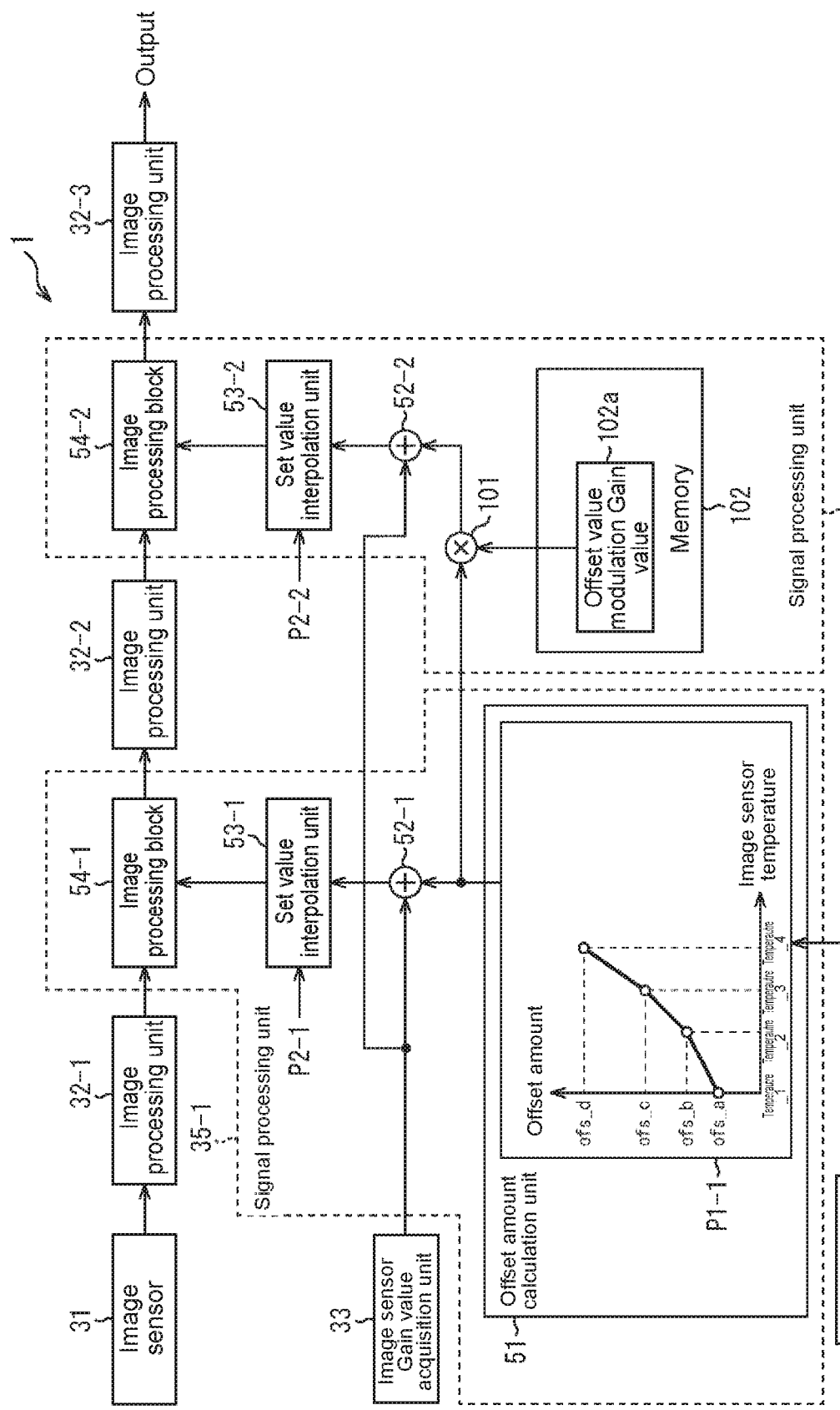
FIG. 11 is a diagram for description of a configuration example of a fourth embodiment of the imaging device of the present disclosure.

FIG. 11 illustrates a configuration example of the imaging device 1 in which one offset amount is multiplied by a constant and used as the other offset amount when a plurality of signal processing units 35 is provided. Note that the imaging device 1 of FIG. 11 is different from a configuration of the imaging device 1 of FIG. 10 in that a multiplication unit 101 and a memory 102 storing an offset amount modulation Gain value 102a are provided instead of the signal processing unit 35-2 and the offset amount calculation unit 51-2.

The multiplication unit 101 of the signal processing unit 35-2 in the imaging device 1 of FIG. 11 acquires an offset amount calculated by the offset amount calculation unit 51 in the signal processing unit 35-1, multiplies the offset amount modulation Gain value 102a corresponding to a predetermined constant stored in the memory 102 to multiply the offset amount of the signal processing unit 35-1 by a constant, and outputs a resultant value to the addition unit 52-2.

That is, when the offset amount of the signal processing unit 35-2 may be 50% of the offset amount of the signal processing unit 35-1, by setting the offset amount modulation Gain value 102a to 0.5, and by multiplying the offset amount of the signal processing unit 35-1 by 0.5, an offset amount corresponding to 50% of the offset amount of the signal processing unit 35-1 can be used as the offset amount of the signal processing unit 35-2.

According to such a configuration, it suffices to use a value obtained by multiplying the offset amount modulation Gain value 102a corresponding to predetermined times by the offset amount of the signal processing unit 35-1 as the offset amount of the signal processing unit 35-2. Thus, in the signal processing unit 35-2, a configuration of the offset amount calculation unit 51 is unnecessary, and it is possible to reduce a cost and a processing load in a device configuration.

As described above, according to the imaging device of the present disclosure, it is possible to reduce the amount of storing the optimum set value of the image processing block that performs processing according to the amount of noise and the processing load related to the interpolation operation thereof.

That is, for example, when set values at four points according to an image sensor Gain value are stored, and set values at four points according to an image sensor temperature value are stored, it is necessary to store 4×4=16 set values. In addition, when there is a plurality of control parameters needed to be optimally set and adjusted according to the noise amount, sixteen combinations need to be stored in groups corresponding to the number of parameters.

However, in the imaging device of the present disclosure, by holding offset values corresponding to four temperature values to obtain an offset amount, adding the offset amount to an image sensor Gain value, and using a resultant value as a Gain value, it is possible to apply correction to each of the image sensor Gain value and the image sensor temperature value, and it is possible to reduce the amount of information of a set value for each control parameter and to reduce a processing load related to interpolation processing.

<Set Value Supply Processing by Imaging Device of FIG. 11>

Figure 12:
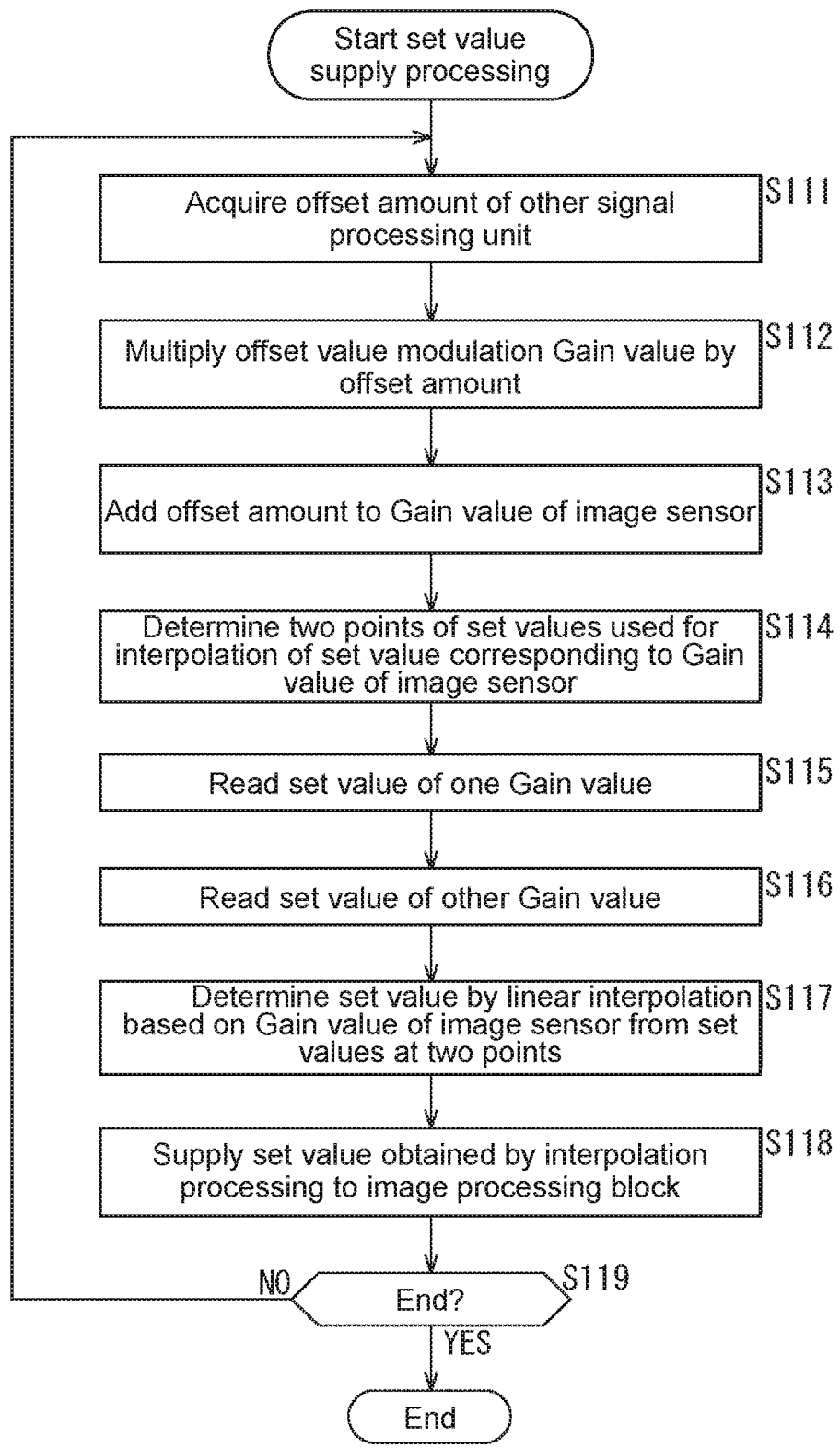
FIG. 12 is a flowchart for description of set value supply processing in image processing by the imaging device of FIG. 11.

Next, a description will be given of set value supply processing by the imaging device 1 of FIG. 11 with reference to a flowchart of FIG. 12. Note that set value supply processing by the signal processing unit 35-1 in the imaging device 1 of FIG. 11 is similar to processing described with reference to FIG. 7. Thus, a description thereof will be omitted, and a description will be given of set value supply processing by the signal processing unit 35-2. However, at the same time, it is presumed that set value supply processing by the signal processing unit 35-1 is performed, and the offset amount of the signal processing unit 35-1 is obtained and supplied to the signal processing unit 35-2. In addition, processing of steps S114 to S119 of FIG. 12 is similar to processing of steps S76 to S82 of FIG. 7, and thus a description thereof will be omitted.

That is, in step S111, the multiplication unit 101 acquires an offset amount obtained by the signal processing unit 35-1.

In step S112, the multiplication unit 101 reads the offset amount modulation Gain value 102a having a predetermined constant stored in the memory 102, multiplies the read value by the acquired offset amount, and supplies a resultant value to the addition unit 52-2.

By subsequent processing, a set value necessary for processing in the signal processing unit 35-2 is obtained and supplied to the image processing block 54-2, and processing is executed.

In this way, in the case of providing a plurality of the signal processing units 35, it is unnecessary to provide the offset amount calculation unit 51 to all the signal processing units 35, and thus it is possible to realize a reduction in device cost, interpolation processing load, and power consumption.

<Example of Application to Electronic Device>

For example, the above-described imaging device 1 can be applied various electronic devices such as an imaging device such as a digital still camera or a digital video camera, a mobile phone having an image pickup function, or another device having an image pickup function.

Figure 13:
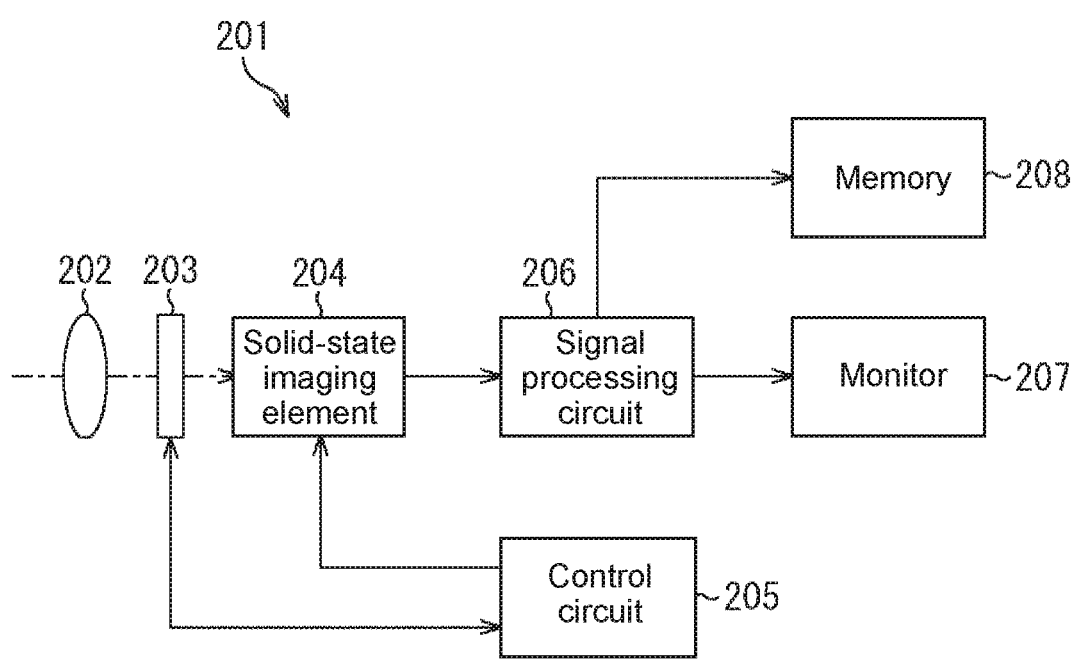
FIG. 13 is a block diagram illustrating a configuration example of an imaging device as an electronic device to which an imaging element of the present disclosure is applied.

FIG. 13 is a block diagram illustrating a configuration example of an imaging device as an electronic device to which the present technology is applied.

The imaging device 201 illustrated in FIG. 13 includes an optical system 202, a shutter device 203, a solid-state imaging element 204, a driving circuit 205, a signal processing circuit 206, a monitor 207, and a memory 208, and can capture a still image and a moving image.

The optical system 202 includes one or a plurality of lenses, guides light (incident light) from a subject to the solid-state imaging element 204, and forms an image on a light receiving surface of the solid-state imaging element 204.

The shutter device 203 is disposed between the optical system 202 and the solid-state imaging element 204, and controls a light irradiation period and a light shielding period with respect to the solid-state imaging element 204 under the control of the driving circuit 205.

The solid-state imaging element 204 is configured by a package including the above-described solid-state imaging element. The solid-state imaging element 204 accumulates a signal charge for a certain period in accordance with light formed on the light receiving surface via the optical system 202 and the shutter device 203. The signal charge accumulated in the solid-state imaging element 204 is transferred according to a driving signal (timing signal) supplied from the driving circuit 205.

The driving circuit 205 outputs driving signals for controlling a transfer operation of the solid-state imaging element 204 and a shutter operation of the shutter device 203 to drive the solid-state imaging element 204 and the shutter device 203.

The signal processing circuit 206 performs various signal processing on signal charges output from the solid-state imaging element 204. An image (image data) obtained by performing signal processing by the signal processing circuit 206 is supplied to the monitor 207 and displayed, or supplied to the memory 208 and stored (recorded).

In the imaging device 201 configured as described above, by applying the signal processing unit 35 in the imaging device 1 to the signal processing circuit 206, it is possible to reduce the amount of information to be stored in the storage element that stores the set value, and to reduce a processing load related to interpolation processing in signal processing. As a result, it is possible to realize a reduction in device cost and power consumption.

<Usage Example of Imaging Element>

Figure 14:
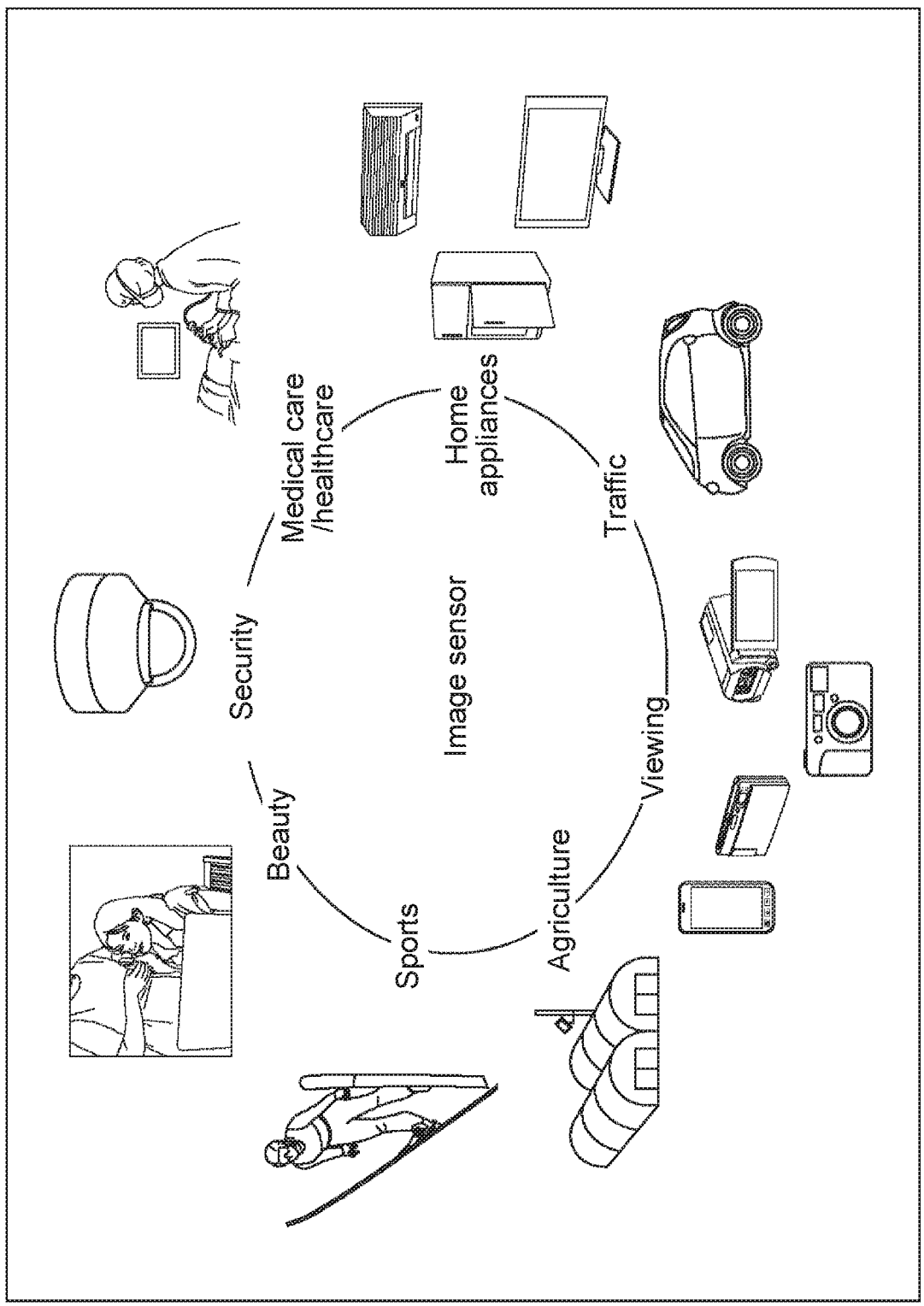
FIG. 14 is a diagram for description of a usage example of the imaging element to which a technology of the present disclosure is applied.

FIG. 14 is a diagram illustrating a usage example of using the imaging device 201.

For example, the above-described imaging element can be used in various cases for sensing light such as visible light, infrared light, ultraviolet light, an X ray, etc., as described below.

- Device for capturing an image provided for viewing, such as a digital camera, a portable device having a camera function, etc.
- Device used for traffic such as an in-vehicle sensor for capturing an image of a front, a back, a periphery, an inside, etc. of a vehicle for safe driving such as automatic stop, recognition of a state of a driver, etc., a surveillance camera for monitoring traveling vehicles and roads, a distance sensor for measurement of a distance between vehicles, etc.

Device used for home appliances such as a TV, a refrigerator, an air conditioner, etc. to capture an image of a gesture of a user and perform an equipment operation according to the gesture Device used for medical care or healthcare such as an endoscope, a device for performing angiography by receiving infrared light, etc.

Device used for security such as a surveillance camera for crime prevention purposes, a camera for person authentication use, etc.

Device used for beauty such as a skin measuring instrument for capturing an image of a skin, a microscope for capturing an image of a scalp, etc.

Device used for sports such as an action cameras or a wearable camera for sports applications Device used for agriculture such as a camera for monitoring a condition of a field or a crop Note that the present disclosure may adopt the following configurations.

<1> An imaging device, including:
an image sensor that captures an image;
a Gain value acquisition unit that acquires a Gain value of the image sensor;
a temperature value acquisition unit that acquires a temperature value of the image sensor; and
a signal processing unit that performs signal processing on the image captured by the image sensor on the basis of the Gain value offset according to the temperature value.

<2> The imaging device according to <1>, in which
the signal processing unit includes
an image processing unit that performs predetermined image processing on the image,
an offset amount calculation unit that calculates an offset amount of the Gain value on the basis of the temperature value,
an addition unit that adds the offset amount to the Gain value acquired by the Gain value acquisition unit, and
a set value generator that generates a set value to be used for the predetermined image processing in the image processing unit on the basis of the Gain value to which the offset amount is added by the addition unit, and
the image processing unit performs the predetermined image processing on the image on the basis of the set value.

<3> The imaging device according to <2>, in which
the offset amount calculation unit stores offset amounts with respect to a plurality of temperature values corresponding to discrete values, and calculates an offset amount of the temperature value acquired by the temperature value acquisition unit by interpolation processing using a plurality of the stored temperature values.

<4> The imaging device according to <3>, in which
the offset amount calculation unit stores offset amounts with respect to a plurality of temperature values corresponding to discrete values, and calculates an offset amount by linear interpolation using offset amounts with respect to temperature values before and after the temperature value acquired by the temperature value acquisition unit among a plurality of the stored temperature values.

<5> The imaging device according to <2>, in which
the offset amount calculation unit calculates an offset amount by interpolation using an nth degree polynomial having the temperature value as a variable.

<6> The imaging device according to <2>, in which
the set value generator stores set values with respect to a plurality of Gain values corresponding to discrete values, and generates a set value by interpolation processing using a plurality of the stored set values.

<7> The imaging device according to <6>, in which
the set value generator stores set values with respect to a plurality of Gain values corresponding to discrete values, and generates a set value by linear interpolation using set values with respect to Gain values before and after the Gain value acquired by the Gain value acquisition unit among a plurality of the stored set values.

<8> The imaging device according to <2>, in which
the set value generator generates a set value by interpolation using an nth degree polynomial having the Gain value as a variable.

<9> The imaging device according to <2>, in which
in a case where a plurality of signal processing units is present, and each of the signal processing units performs different predetermined signal processing on the image, the offset amount calculation unit of each of a plurality of the signal processing units stores different offset amounts with respect to a plurality of temperature values corresponding to the discrete values, respectively.

<10> The imaging device according to <1>, in which
in a case where there is a plurality of signal processing units, each of which performing different signal processing on the image,
each of some signal processing units among a plurality of the signal processing units includes
a first image processing unit that performs first image processing on the image,
a first offset amount calculation unit that calculates a first offset amount of the Gain value on the basis of the temperature value,
a first addition unit that adds the first offset amount to the Gain value acquired by the Gain value acquisition unit, and
a first set value generator that generates a first set value to be used for the first image processing in the image processing unit on the basis of the Gain value to which the first offset amount is added by the first addition unit,
the first image processing unit performing the first image processing on the image on the basis of the first set value,
each of some other signal processing units different from the some signal processing units among a plurality of the signal processing units includes
a second image processing unit that performs second image processing on the image,
a second offset amount calculation unit that calculates a second offset amount by multiplying a predetermined coefficient by the first offset amount calculated by the first offset amount calculation unit,
a second addition unit that adds the second offset amount to the Gain value acquired by the Gain value acquisition unit, and
a second set value generator that generates a second set value to be used for the second image processing in the second image processing unit on the basis of the Gain value to which the second offset amount is added by the second addition unit, and
the second image processing unit performing the second image processing on the image on the basis of the second set value.

<11> An imaging method for an imaging device including
an image sensor that captures an image,
a Gain value acquisition unit that acquires a Gain value of the image sensor, and
a temperature value acquisition unit that acquires a temperature value of the image sensor, the imaging method, including:
performing signal processing on the image captured by the image sensor on the basis of the Gain value offset according to the temperature value.

<12> An electronic device, including:
a Gain value acquisition unit that acquires a Gain value of the image sensor;
a temperature value acquisition unit that acquires a temperature value of the image sensor; and
a signal processing unit that performs signal processing on the image captured by the image sensor on the basis of the Gain value offset according to the temperature value.

<13> A signal processing device, including:
an image processing unit that performs predetermined image processing on an image captured by an image sensor;
an offset amount calculation unit that calculates an offset amount of a Gain value of the image sensor on the basis of a temperature value of the image sensor;
an addition unit that adds the offset amount to the Gain value of the image sensor; and
a set value generator that generates a set value to be used for the predetermined image processing in the image processing unit on the basis of the Gain value to which the offset amount is added by the addition unit, in which
the image processing unit performs the predetermined image processing on the image on the basis of the set value.

REFERENCE SIGNS LIST 1 imaging device
31 image sensor
32, 32-1 to 32-3 image processing unit
33 image sensor Gain value acquisition unit
34 image sensor temperature value
35, 35-1, 35-2 signal processing unit
51, 51-, 51-2 offset amount calculation unit
52, 52-1, 52-2 addition unit
53, 53-1, 53-2 set value interpolation unit
54, 54-1, 54-2 image processing block
71 offset amount calculation unit
72 set value interpolation unit
101 multiplication unit
102 memory
102a offset value modulation Gain value

The invention claimed is:
1. An imaging device, comprising:
an image sensor configured to capture an image;
first circuitry configured to acquire a Gain value of the image sensor;
second circuitry configured to acquire a temperature value of the image sensor; and
third circuitry configured to:
calculate a first offset amount of the acquired Gain value based on the acquired temperature value;
add the calculated first offset amount to the acquired Gain value;
generate a first set value based on a result of the addition of the calculated first offset amount to the acquired Gain value; and
execute a first image processing on the captured image based on the generated first set value.
2. The imaging device according to claim 1, wherein the third circuitry is further configured to:
store, in a memory, offset amounts with respect to a plurality of temperature values corresponding to discrete values; and
calculate a second offset amount of the acquired temperature value based on interpolation processing that uses the plurality of the stored temperature values.
3. The imaging device according to claim 2, wherein
the third circuitry is further configured to calculate a third offset amount based on linear interpolation that uses specific offset amounts with respect to specific temperature values before and after the acquired temperature value, and
the specific temperature values are among the plurality of the stored temperature values.
4. The imaging device according to claim 1, wherein
the third circuitry is further configured to calculate a second offset amount based on interpolation that uses an nth degree polynomial having the acquired temperature value as a variable.
5. The imaging device according to claim 1, wherein the third circuitry is further configured to:
store, in a memory, set values with respect to a plurality of Gain values corresponding to discrete values; and
generate a second set value based on interpolation processing that uses a plurality of the stored set values.
6. The imaging device according to claim 5, wherein
the third circuitry is further configured to generate a third set value based on linear interpolation that uses specific set values with respect to specific Gain values before and after the acquired Gain value, and
the specific set values are among the plurality of the stored set values.
7. The imaging device according to claim 1, wherein
the third circuitry is further configured to generate a second set value based on interpolation that uses an nth degree polynomial having the acquired Gain value as a variable.
8. The imaging device according to claim 1, further comprising a plurality of third circuitry, wherein each third circuitry of the plurality of third circuitry is configured to:
execute a different signal processing on the captured image; and
store, in a memory, different offset amounts with respect to a plurality of temperature values corresponding to discrete values.
9. The imaging device according to claim 1, further comprising a plurality of third circuitry, wherein
each third circuitry of the plurality of third circuitry is configured to execute a different signal processing on the captured image, and
the plurality of third circuitry includes a first set of third circuitry and a second set of third circuitry different from the first set of third circuitry, wherein
each third circuitry of the first set of third circuitry is configured to:
execute a second first image processing on the captured image;
calculate a fourth offset amount of the Gain value based on the acquired temperature value;
add the calculated fourth first offset amount to the acquired Gain value;
generate a third set value based on a result of the addition of the calculated first offset amount to the acquired Gain value; and
execute the second image processing on the image based on the first third set value, and
each third circuitry of the second set of third circuitry of is configured to:
execute a third image processing on the captured image;

calculate a fifth offset amount by based on multiplication of a coefficient by the calculated fourth offset amount;

add the calculated fifth offset amount to the acquired Gain value;

generate a fourth set value based on a result of the addition of the calculated fifth offset amount to the acquired Gain value; and execute the third image processing on the captured image based on the generated fourth set value.

10. An imaging method for an imaging device, the imaging method comprising:

capturing, by an image sensor;

acquiring, by first circuitry, a Gain value of the image sensor;

acquiring, by second circuitry, a temperature value of the image sensor;

calculating, by third circuitry, an offset amount of the acquired Gain value based on the acquired temperature value;

adding, by the third circuitry, the calculated offset amount to the acquired Gain value;

generating, by the third circuitry, a set value based on a result of the addition of the calculated offset amount to the acquired Gain value; and executing, by the third circuitry, image processing on the captured image based on the generated set value.

11. An electronic device, comprising:

an image sensor configured to capture an image;

first circuitry configured to acquire a Gain value of the image sensor;

second circuitry configured to acquire a temperature value of the image sensor; and third circuitry configured to:

calculate an offset amount of the acquired Gain value based on the acquired temperature value;

add the calculated offset amount to the acquired Gain value;

generate a set value based on a result of the addition of the calculated offset amount to the acquired Gain value; and execute an image processing on the captured image based on the generated set value.

12. A signal processing device, comprising:

first circuitry configured to calculate an offset amount of a Gain value of an image sensor based on a temperature value of the image sensor;

second circuitry configured to add the calculated offset amount to the Gain value of the image sensor; and third circuitry configured to:

generate a set value based on a result of the addition of the calculated offset amount to the Gain value; and execute a specific image processing on an image based on the generated set value, wherein the image is captured by the image sensor.

\* \* \* \* \*